(12) United States Patent
Alland et al.

(10) Patent No.: US 10,573,959 B2
(45) Date of Patent: Feb. 25, 2020

(54) VEHICLE RADAR SYSTEM USING SHAPED ANTENNA PATTERNS

(71) Applicant: UHNDER, INC., Austin, TX (US)

(72) Inventors: Stephen W. Alland, Newbury Park, CA (US); Curtis Davis, St. Louis, MO (US); Marius Goldenberg, Austin, TX (US)

(73) Assignee: Uhnder, Inc., Austin, TX (US)

( * ) Notice: Subject to any disclaimer, the term of this patent is extended or adjusted under 35 U.S.C. 154(b) by 0 days.

(21) Appl. No.: 15/598,664

(22) Filed: May 18, 2017

(65) Prior Publication Data

US 2017/0309997 A1    Oct. 26, 2017

Related U.S. Application Data

(63) Continuation of application No. PCT/IB2017/052375, filed on Apr. 25, 2017.
(Continued)

(51) Int. Cl.
*H01Q 1/32* (2006.01)
*H01Q 3/34* (2006.01)
(Continued)

(52) U.S. Cl.
CPC ......... *H01Q 1/3233* (2013.01); *G01S 7/2813* (2013.01); *G01S 13/86* (2013.01);
(Continued)

(58) Field of Classification Search
CPC .. H01Q 1/3233; H01Q 1/3283; H01Q 1/3291; H01Q 3/00; H01Q 3/24;
(Continued)

(56) References Cited

U.S. PATENT DOCUMENTS 1,882,128 A    10/1932 Fearing
3,374,478 A    3/1968 Blau
(Continued)

FOREIGN PATENT DOCUMENTS

EP    0725480    11/2011
EP    2374217    4/2013
(Continued)

OTHER PUBLICATIONS

Chambers et al., An article entitled "Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.
(Continued)

*Primary Examiner* — Peter M Bythrow
(74) *Attorney, Agent, or Firm* — Gardner Linn

(57) ABSTRACT

A radar sensing system for a vehicle, the radar sensing system including a transmitter and a receiver. The transmitter is configured to transmit a radio signal. The receiver is configured to receive the transmitted radio signal reflected from objects in the environment. The transmitter includes an antenna and is configured to transmit the radio signal via the antenna. The antenna includes a plurality of linear arrays of patch radiators. An arrangement of the linear arrays of patch radiators is selected to form a desired shaped antenna pattern having a desired mainlobe shape and desired shoulder shapes to cover selected sensing zones without nulls or holes in the coverage.

24 Claims, 22 Drawing Sheets

Related U.S. Application Data

(60) Provisional application No. 62/327,018, filed on Apr. 25, 2016.

(51) Int. Cl.

| | | |
|---|---|---|
| *H01Q 21/22* | (2006.01) | |
| *H01Q 21/29* | (2006.01) | |
| *H01Q 21/06* | (2006.01) | |
| *G01S 13/93* | (2020.01) | |
| *H01Q 3/30* | (2006.01) | |
| *G01S 13/86* | (2006.01) | |
| *G01S 7/28* | (2006.01) | |
| *H01Q 3/28* | (2006.01) | |
| *H01Q 21/08* | (2006.01) | |
| *H04B 7/0413* | (2017.01) | |
| *H04B 7/06* | (2006.01) | |
| *G01S 13/42* | (2006.01) | |
| *G01S 13/931* | (2020.01) | |

(52) U.S. Cl.
CPC .......... *G01S 13/931* (2013.01); *H01Q 1/3283* (2013.01); *H01Q 3/28* (2013.01); *H01Q 3/30* (2013.01); *H01Q 3/34* (2013.01); *H01Q 21/065* (2013.01); *H01Q 21/08* (2013.01); *H01Q 21/22* (2013.01); *H01Q 21/29* (2013.01); *G01S 13/42* (2013.01); *G01S 2013/9375* (2013.01); *G01S 2013/9378* (2013.01); *H04B 7/0413* (2013.01); *H04B 7/0617* (2013.01)

(58) Field of Classification Search
CPC ...... H01Q 3/26; H01Q 3/2605; H01Q 3/2623; H01Q 3/2629; H01Q 3/2635; H01Q 3/2641; H01Q 3/2658; H01Q 3/245; H01Q 21/065; H01Q 21/12; H01Q 21/22; H01Q 21/225; H01Q 21/29; H01Q 21/293; H01Q 21/30; G01S 13/931; G01S 13/9314; G01S 13/9317; G01S 13/9321; G01S 13/9325; G01S 13/9342; G01S 13/935; G01S 13/9353; G01S 13/9371; G01S 13/9375; G01S 2013/0254

See application file for complete search history.

(56) References Cited

U.S. PATENT DOCUMENTS

| | | |
|---|---|---|
| 3,735,395 A | 5/1973 | Ross |
| 3,750,169 A | 7/1973 | Strenglein |
| 3,896,434 A | 7/1975 | Sirven |
| 4,078,234 A | 3/1978 | Fishbein et al. |
| 4,176,351 A | 11/1979 | De Vita et al. |
| 4,566,010 A | 1/1986 | Collins |
| 4,612,547 A * | 9/1986 | Itoh .................. H01Q 3/24 342/372 |
| 4,882,668 A | 11/1989 | Schmid et al. |
| 4,910,464 A | 3/1990 | Trett et al. |
| 4,939,685 A | 7/1990 | Feintuch |
| 5,001,486 A | 3/1991 | Bächtiger |
| 5,012,254 A * | 4/1991 | Thompson ............. H01Q 21/22 342/373 |
| 5,034,906 A | 7/1991 | Chang |
| 5,087,918 A | 2/1992 | May et al. |
| 5,151,702 A | 9/1992 | Urkowitz |
| 5,175,710 A | 12/1992 | Hutson |
| 5,218,619 A | 6/1993 | Dent |
| 5,272,663 A | 12/1993 | Jones et al. |
| 5,280,288 A | 1/1994 | Sherry et al. |
| 5,302,956 A | 4/1994 | Asbury et al. |
| 5,341,141 A | 8/1994 | Frazier et al. |
| 5,345,470 A | 9/1994 | Alexander |
| 5,376,939 A | 12/1994 | Urkowitz |
| 5,379,322 A | 1/1995 | Kosaka et al. |
| 5,497,162 A | 3/1996 | Kaiser |
| 5,508,706 A | 4/1996 | Tsou et al. |
| 5,581,464 A | 12/1996 | Woll et al. |
| 5,657,021 A | 8/1997 | Ehsani-Nategh et al. |
| 5,657,023 A | 8/1997 | Lewis et al. |
| 5,691,724 A | 11/1997 | Aker et al. |
| 5,712,640 A | 1/1998 | Andou et al. |
| 5,724,041 A | 3/1998 | Inoue et al. |
| 5,892,477 A | 4/1999 | Wehling |
| 5,917,430 A | 6/1999 | Greneker, III et al. |
| 5,920,285 A | 7/1999 | Benjamin |
| 5,931,893 A | 8/1999 | Dent et al. |
| 5,959,571 A | 9/1999 | Aoyagi et al. |
| 5,970,400 A | 10/1999 | Dwyer |
| 6,067,314 A | 5/2000 | Azuma |
| 6,069,581 A | 5/2000 | Bell et al. |
| 6,121,872 A | 9/2000 | Weishaupt |
| 6,121,918 A | 9/2000 | Tullsson |
| 6,151,366 A | 11/2000 | Yip |
| 6,163,252 A | 12/2000 | Nishiwaki |
| 6,191,726 B1 | 2/2001 | Tullsson |
| 6,184,829 B1 | 9/2001 | Stilp |
| 6,288,672 B1 | 9/2001 | Asano et al. |
| 6,307,622 B1 | 10/2001 | Lewis |
| 6,347,264 B2 | 2/2002 | Nicosia et al. |
| 6,400,308 B1 | 6/2002 | Bell et al. |
| 6,411,250 B1 | 6/2002 | Oswald et al. |
| 6,417,796 B1 | 7/2002 | Bowlds |
| 6,424,289 B2 | 7/2002 | Fukae et al. |
| 6,583,753 B1 | 6/2003 | Reed |
| 6,614,387 B1 | 9/2003 | Deadman |
| 6,624,784 B1 | 9/2003 | Yamaguchi |
| 6,674,908 B1 | 1/2004 | Aronov |
| 6,714,956 B1 | 3/2004 | Liu et al. |
| 6,747,595 B2 | 6/2004 | Hirabe |
| 6,768,391 B1 | 7/2004 | Dent et al. |
| 6,865,218 B1 | 3/2005 | Sourour |
| 6,975,246 B1 | 12/2005 | Trudeau |
| 7,119,739 B1 | 10/2006 | Struckman |
| 7,289,058 B2 | 10/2007 | Shima |
| 7,299,251 B2 | 11/2007 | Skidmore et al. |
| 7,338,450 B2 | 3/2008 | Kristofferson et al. |
| 7,395,084 B2 | 7/2008 | Anttila |
| 7,460,055 B2 | 12/2008 | Nishijima et al. |
| 7,474,258 B1 | 1/2009 | Arikan et al. |
| 7,545,310 B2 | 6/2009 | Matsuoka |
| 7,545,321 B2 | 6/2009 | Kawasaki |
| 7,564,400 B2 | 7/2009 | Fukuda |
| 7,567,204 B2 | 7/2009 | Sakamoto |
| 7,609,198 B2 | 10/2009 | Chang |
| 7,642,952 B2 | 1/2010 | Fukuda |
| 7,663,533 B2 | 2/2010 | Toennesen |
| 7,728,762 B2 | 6/2010 | Sakamoto |
| 7,791,528 B2 | 9/2010 | Klotzbuecher |
| 7,847,731 B2 | 12/2010 | Wiesbeck |
| 7,855,677 B2 | 12/2010 | Negoro et al. |
| 7,859,450 B2 | 12/2010 | Shirakawa et al. |
| 8,019,352 B2 | 9/2011 | Rappaport et al. |
| 8,049,663 B2 | 11/2011 | Frank et al. |
| 8,059,026 B1 | 11/2011 | Nunez |
| 8,102,306 B2 | 1/2012 | Smith, Jr. et al. |
| 8,154,436 B2 | 4/2012 | Szajnowski |
| 8,330,650 B2 | 12/2012 | Goldman |
| 8,390,507 B2 | 3/2013 | Wintermantel |
| 8,471,760 B2 | 6/2013 | Szajnowski |
| 8,532,159 B2 | 9/2013 | Kagawa et al. |
| 8,547,988 B2 | 10/2013 | Hadani et al. |
| 8,686,894 B2 | 4/2014 | Fukuda et al. |
| 8,694,306 B1 | 4/2014 | Short et al. |
| 9,121,943 B2 | 9/2015 | Stirling-Gallacher et al. |
| 9,239,379 B2 | 1/2016 | Burgio et al. |
| 9,282,945 B2 | 3/2016 | Smith et al. |
| 9,335,402 B2 | 5/2016 | Maeno et al. |
| 9,400,328 B2 | 7/2016 | Hsiao |
| 9,541,639 B2 | 1/2017 | Searcy et al. |
| 9,568,600 B2 | 2/2017 | Alland |
| 9,575,160 B1 | 2/2017 | Davis et al. |

(56) References Cited

U.S. PATENT DOCUMENTS

| | | |
|---|---|---|
| 9,599,702 B1 | 3/2017 | Bordes et al. |
| 9,753,121 B1 | 9/2017 | Davis et al. |
| 9,772,397 B1 | 9/2017 | Bordes et al. |
| 9,791,551 B1 | 10/2017 | Eshraghi et al. |
| 9,791,564 B1 | 10/2017 | Harris et al. |
| 9,806,914 B1 | 10/2017 | Bordes et al. |
| 9,829,567 B1 | 11/2017 | Davis et al. |
| 9,846,228 B2 | 12/2017 | Davis et al. |
| 9,869,762 B1 | 1/2018 | Alland et al. |
| 2001/0002919 A1 | 6/2001 | Sourour et al. |
| 2002/0004692 A1 | 1/2002 | Nicosia et al. |
| 2002/0044082 A1* | 4/2002 | Woodington ...... B60K 31/0008 342/70 |
| 2002/0075178 A1 | 6/2002 | Woodington et al. |
| 2002/0118522 A1 | 8/2002 | Ho et al. |
| 2002/0130811 A1 | 9/2002 | Voigtaender |
| 2002/0147534 A1* | 10/2002 | Delcheccolo ...... B60K 31/0008 701/45 |
| 2002/0155811 A1 | 10/2002 | Prismantas |
| 2003/0001772 A1 | 1/2003 | Woodington et al. |
| 2003/0011519 A1* | 1/2003 | Breglia ............. B60K 31/0008 343/700 MS |
| 2003/0058166 A1 | 3/2003 | Hirabe |
| 2003/0073463 A1* | 4/2003 | Shapira ................. H01Q 1/246 455/562.1 |
| 2003/0080713 A1 | 5/2003 | Kirmuss |
| 2003/0102997 A1 | 6/2003 | Levin et al. |
| 2003/0235244 A1 | 12/2003 | Pessoa et al. |
| 2004/0012516 A1 | 1/2004 | Schiffmann |
| 2004/0015529 A1 | 1/2004 | Tanrikulu et al. |
| 2004/0066323 A1 | 4/2004 | Richter |
| 2004/0138802 A1 | 7/2004 | Kuragaki et al. |
| 2005/0069162 A1 | 3/2005 | Haykin |
| 2005/0156780 A1* | 7/2005 | Bonthron ................. G01S 3/48 342/107 |
| 2005/0201457 A1 | 9/2005 | Allred et al. |
| 2005/0225476 A1 | 10/2005 | Hoetzel et al. |
| 2005/0273480 A1 | 12/2005 | Pugh et al. |
| 2006/0012511 A1 | 1/2006 | Dooi et al. |
| 2006/0036353 A1 | 2/2006 | Wintermantel |
| 2006/0050707 A1 | 3/2006 | Sterin |
| 2006/0093078 A1 | 5/2006 | Lewis et al. |
| 2006/0109170 A1 | 5/2006 | Voigtlaender et al. |
| 2006/0109931 A1 | 5/2006 | Asai |
| 2006/0114324 A1 | 6/2006 | Farmer et al. |
| 2006/0140249 A1 | 6/2006 | Kohno |
| 2006/0181448 A1 | 8/2006 | Natsume et al. |
| 2006/0244653 A1 | 11/2006 | Szajnowski |
| 2006/0262007 A1* | 11/2006 | Bonthron ................. G01S 13/34 342/70 |
| 2006/0262009 A1 | 11/2006 | Watanabe |
| 2007/0018884 A1 | 1/2007 | Adams |
| 2007/0018886 A1 | 1/2007 | Watanabe et al. |
| 2007/0109175 A1 | 5/2007 | Fukuda |
| 2007/0115869 A1 | 5/2007 | Lakkis |
| 2007/0120731 A1 | 5/2007 | Kelly, Jr. et al. |
| 2007/0132633 A1 | 6/2007 | Uchino |
| 2007/0152870 A1 | 7/2007 | Woodington et al. |
| 2007/0152871 A1 | 7/2007 | Puglia |
| 2007/0152872 A1 | 7/2007 | Woodington |
| 2007/0164896 A1 | 7/2007 | Suzuki et al. |
| 2007/0171122 A1 | 7/2007 | Nakano |
| 2007/0182619 A1* | 8/2007 | Honda .................. H01Q 25/02 342/80 |
| 2007/0182623 A1 | 8/2007 | Zeng |
| 2007/0188373 A1 | 8/2007 | Shirakawa et al. |
| 2007/0200747 A1 | 8/2007 | Okai |
| 2007/0263748 A1 | 11/2007 | Mesecher |
| 2007/0279303 A1* | 12/2007 | Schoebel ........... H01Q 21/0075 343/713 |
| 2008/0088499 A1* | 4/2008 | Bonthron ............. G01S 13/931 342/104 |
| 2008/0208472 A1 | 8/2008 | Morcom |
| 2008/0258964 A1* | 10/2008 | Schoeberl ............... G01S 7/032 342/189 |
| 2008/0272955 A1* | 11/2008 | Yonak ................... G01S 13/931 342/54 |
| 2009/0003412 A1 | 1/2009 | Negoro et al. |
| 2009/0015459 A1 | 1/2009 | Mahler et al. |
| 2009/0015464 A1 | 1/2009 | Fukuda |
| 2009/0027257 A1 | 1/2009 | Arikan |
| 2009/0051581 A1 | 2/2009 | Hatono |
| 2009/0072957 A1 | 3/2009 | Wu et al. |
| 2009/0073025 A1 | 3/2009 | Inoue et al. |
| 2009/0079617 A1 | 3/2009 | Shirakawa et al. |
| 2009/0085827 A1 | 4/2009 | Orime et al. |
| 2009/0103593 A1 | 4/2009 | Bergamo |
| 2009/0121918 A1 | 5/2009 | Shirai et al. |
| 2009/0212998 A1 | 8/2009 | Szajnowski |
| 2009/0237293 A1 | 9/2009 | Sakuma |
| 2009/0267822 A1* | 10/2009 | Shinoda .................. G01S 7/352 342/70 |
| 2009/0289831 A1 | 11/2009 | Akita |
| 2009/0295623 A1 | 12/2009 | Falk |
| 2010/0001897 A1 | 1/2010 | Lyman |
| 2010/0019950 A1 | 1/2010 | Yamano et al. |
| 2010/0116365 A1 | 5/2010 | McCarty |
| 2010/0156690 A1 | 6/2010 | Kim et al. |
| 2010/0198513 A1 | 8/2010 | Zeng et al. |
| 2010/0277359 A1 | 11/2010 | Ando |
| 2010/0289692 A1 | 11/2010 | Winkler |
| 2011/0006944 A1 | 1/2011 | Goldman |
| 2011/0032138 A1 | 2/2011 | Krapf |
| 2011/0074620 A1 | 3/2011 | Wintermantel |
| 2011/0187600 A1 | 8/2011 | Landt |
| 2011/0196568 A1 | 8/2011 | Nickolaou |
| 2011/0248796 A1 | 10/2011 | Pozgay |
| 2011/0279303 A1 | 11/2011 | Smith, Jr. et al. |
| 2011/0279307 A1 | 11/2011 | Song |
| 2011/0285576 A1 | 11/2011 | Lynam |
| 2011/0291874 A1 | 12/2011 | De Mersseman |
| 2011/0291875 A1 | 12/2011 | Szajnowski |
| 2011/0292971 A1 | 12/2011 | Hadani et al. |
| 2012/0001791 A1 | 1/2012 | Wintermantel |
| 2012/0050093 A1 | 3/2012 | Heilmann et al. |
| 2012/0105268 A1 | 5/2012 | Smits et al. |
| 2012/0112957 A1 | 5/2012 | Nguyen et al. |
| 2012/0133547 A1 | 5/2012 | MacDonald et al. |
| 2012/0173246 A1 | 7/2012 | Choi et al. |
| 2012/0195349 A1 | 8/2012 | Lakkis |
| 2012/0249356 A1 | 10/2012 | Shope |
| 2012/0257643 A1 | 10/2012 | Wu et al. |
| 2012/0314799 A1 | 12/2012 | In De Betou et al. |
| 2012/0319900 A1* | 12/2012 | Johansson ............. H01Q 1/246 342/368 |
| 2013/0016761 A1 | 1/2013 | Nentwig |
| 2013/0021196 A1 | 1/2013 | Himmelstoss |
| 2013/0027240 A1 | 1/2013 | Chowdhury |
| 2013/0069818 A1 | 3/2013 | Shirakawa et al. |
| 2013/0102254 A1 | 4/2013 | Cyzs |
| 2013/0113652 A1 | 5/2013 | Smits et al. |
| 2013/0113653 A1 | 5/2013 | Kishigami et al. |
| 2013/0135140 A1 | 5/2013 | Kishigami |
| 2013/0169485 A1 | 7/2013 | Lynch |
| 2013/0176154 A1 | 7/2013 | Bonaccio et al. |
| 2013/0214961 A1* | 8/2013 | Lee ............................ G01S 3/74 342/27 |
| 2013/0229301 A1 | 9/2013 | Kanamoto |
| 2013/0244710 A1 | 9/2013 | Nguyen et al. |
| 2013/0249730 A1 | 9/2013 | Adcook |
| 2013/0314271 A1 | 11/2013 | Braswell et al. |
| 2013/0321196 A1 | 12/2013 | Binzer et al. |
| 2014/0022108 A1 | 1/2014 | Alberth, Jr. et al. |
| 2014/0028491 A1 | 1/2014 | Ferguson |
| 2014/0035774 A1 | 2/2014 | Khlifi |
| 2014/0070985 A1 | 3/2014 | Vacanti |
| 2014/0085128 A1 | 3/2014 | Kishigami et al. |
| 2014/0111372 A1 | 4/2014 | Wu |
| 2014/0139322 A1 | 5/2014 | Wang et al. |
| 2014/0159948 A1 | 6/2014 | Ishimori et al. |
| 2014/0220903 A1 | 8/2014 | Schulz et al. |
| 2014/0253345 A1 | 9/2014 | Breed |

(56) References Cited

U.S. PATENT DOCUMENTS

| | | |
|---|---|---|
| 2014/0285373 A1 | 9/2014 | Kuwahara et al. |
| 2014/0327566 A1 | 11/2014 | Burgio et al. |
| 2014/0348253 A1 | 11/2014 | Mobasher et al. |
| 2015/0002329 A1 | 1/2015 | Murad et al. |
| 2015/0002357 A1 | 1/2015 | Sanford et al. |
| 2015/0035662 A1 | 2/2015 | Bowers et al. |
| 2015/0061922 A1 | 3/2015 | Kishigami |
| 2015/0103745 A1 | 4/2015 | Negus et al. |
| 2015/0198709 A1 | 7/2015 | Inoue |
| 2015/0204966 A1 | 7/2015 | Kishigami |
| 2015/0204971 A1 | 7/2015 | Kuehnle |
| 2015/0226848 A1 | 8/2015 | Park |
| 2015/0234045 A1 | 8/2015 | Rosenblum |
| 2015/0247924 A1 | 9/2015 | Kishigami |
| 2015/0255867 A1* | 9/2015 | Inoue ............... H01Q 1/38 343/853 |
| 2015/0301172 A1 | 10/2015 | Ossowska |
| 2015/0323660 A1 | 11/2015 | Hampikian |
| 2015/0331090 A1 | 11/2015 | Jeong et al. |
| 2016/0003938 A1 | 1/2016 | Gazit |
| 2016/0003939 A1 | 1/2016 | Stainvas et al. |
| 2016/0018511 A1 | 1/2016 | Nayyar et al. |
| 2016/0033631 A1 | 2/2016 | Searcy et al. |
| 2016/0033632 A1 | 2/2016 | Searcy et al. |
| 2016/0041260 A1 | 2/2016 | Cao et al. |
| 2016/0061935 A1 | 3/2016 | McCloskey et al. |
| 2016/0084941 A1 | 3/2016 | Hassan |
| 2016/0084943 A1 | 3/2016 | Arage |
| 2016/0091595 A1 | 3/2016 | Alcalde |
| 2016/0124086 A1 | 5/2016 | Jansen et al. |
| 2016/0139254 A1 | 5/2016 | Wittenberg |
| 2016/0146931 A1 | 5/2016 | Rao et al. |
| 2016/0213258 A1 | 7/2016 | Lashkari et al. |
| 2016/0238694 A1 | 8/2016 | Kishigami |
| 2017/0023661 A1 | 1/2017 | Richert |
| 2017/0023663 A1 | 1/2017 | Subburaj et al. |
| 2017/0117950 A1* | 4/2017 | Strong ............... H04B 7/0452 |
| 2017/0219689 A1 | 8/2017 | Hung et al. |
| 2017/0234968 A1 | 8/2017 | Roger et al. |
| 2017/0293025 A1 | 10/2017 | Davis et al. |
| 2017/0293027 A1 | 10/2017 | Stark et al. |
| 2017/0307728 A1 | 10/2017 | Eshraghi et al. |
| 2017/0309997 A1 | 10/2017 | Alland et al. |
| 2017/0310758 A1 | 10/2017 | Davis et al. |
| 2017/0336495 A1 | 11/2017 | Davis et al. |

FOREIGN PATENT DOCUMENTS

| | | |
|---|---|---|
| EP | 2821808 | 1/2015 |
| FR | 2751086 | 1/1998 |
| WO | WO2015175078 | 11/2015 |
| WO | WO2015185058 | 12/2015 |
| WO | WO2016011407 | 1/2016 |
| WO | WO2016030656 | 3/2016 |
| WO | WO2017175190 | 10/2017 |
| WO | WO2017187330 | 11/2017 |

OTHER PUBLICATIONS

Fraser, "Design and simulation of a coded sequence ground penetrating radar," In: Diss. University of British Columbia, Dec. 3, 2015.

Zhou et al., "Linear extractors for extracting randomness from noisy sources," In: Information Theory Proceedings (ISIT), 2011 IEEE International Symposium on Oct. 3, 2011.

International Search Report and Written Opinion dated Sep. 5, 2017 from corresponding PCT Application No. PCT/IB2017/052375.

V. Giannini et al., "A 79 GHz Phase-Modulated 4 GHz-BW CW Radar Transmitter in 28 nm CMOS,"in IEEE Journal of Solid-State Circuits, vol. 49, No. 12, pp. 2925-2937, Dec. 2014. (Year: 2014).

Óscar Faus Garcia, " Signal Processing for mm Wave MIMO Radar," University of Gavle, Faculty of Engineering and Sustainable Development, Jun. 2015; Retrieved from the Internet from http://www.diva-portal.se/smash/get/diva2:826028/FULLTEXT01.pdf.

\* cited by examiner

VEHICLE RADAR SYSTEM USING SHAPED ANTENNA PATTERNS

CROSS REFERENCE TO RELATED APPLICATIONS

The present application is a continuation of International Application No. PCT/IB2017/052375, filed Apr. 25, 2017, which claims the filing benefits of U.S. provisional application, Ser. No. 62/327,018, filed Apr. 25, 2016, which are hereby incorporated herein by reference in their entireties.

FIELD OF THE INVENTION

The present invention is directed to radar systems, and more particularly to radar systems for vehicles.

BACKGROUND OF THE INVENTION

The use of radar to determine range and velocity of objects in an environment is important in a number of applications including automotive radar and gesture detection. A radar system typically transmits radio signals and listens for the reflection of the radio signals from objects in the environment. By comparing the transmitted radio signals with the received radio signals, a radar system can determine the distance to an object. Using Doppler processing, the velocity of an object can be determined. Using various transmitter and receiver combinations, the location (angle) of an object can also be determined.

SUMMARY OF THE INVENTION

Methods and systems of the present invention provide for a shaped antenna pattern to enable a single radar system to support long, medium, and short range applications with a single set of sensing elements. An exemplary radar system of the present invention provides for an antenna pattern with a narrow, high-gain mainlobe for long range coverage and lower gain, broad shoulders for wider field of view or sensing (FOV) medium range and/or short range coverage. This exemplary radar system with the shaped antenna pattern reduces the overall number of sensors, and related cost, for vehicular applications. Difficulties, and cost of, integrating a large number of sensors on the vehicle are also mitigated.

A radar sensing system for a vehicle in accordance with an embodiment of the present invention includes a transmitter and a receiver. The transmitter is operable to or configured to transmit a radio signal. The receiver is operable to or configured to receive the transmitted radio signal reflected from objects in the environment. The transmitter includes an antenna and is operable to or configured to transmit the radio signal via the antenna. The antenna includes a plurality of linear arrays of radiators. An arrangement of the linear arrays of radiators is selected to form a selected or desired shaped antenna pattern having a selected or desired mainlobe shape and selected or desired shoulder shapes to cover selected sensing zones without nulls or holes in the coverage.

In an aspect of the present invention, cost and size of an individual sensor is reduced as well when compared to the cost and size of a sensor with multiple sets of sensing elements assigned to different sensing zones.

In another aspect of the present invention, the shaped antenna pattern is tailored to the detection ranges required for the different sensing zones with a smooth pattern shape that avoids nulls or holes in the coverage pattern, thereby mitigating drawbacks inherent in the approach using antenna pattern sidelobes to cover selected sensing zones.

In another aspect of the present invention, compared to the phased array solution, the exemplary embodiment reduces costs. Furthermore, the exemplary embodiment is compatible with MIMO radar techniques which provide phased array type flexibility on receive via digital beamforming. MIMO radar techniques also offer advantages compared to phased array radar, including a synthetically enhanced virtual receive antenna with improved angle resolution and accuracy. Another advantage of MIMO radar with digital beamforming is the entire field of view or sensing (FOV) can be covered in a single, long duration dwell with improved Doppler resolution.

These and other objects, advantages, purposes and features of the present invention will become apparent upon review of the following specification in conjunction with the drawings.

DESCRIPTION OF THE PREFERRED EMBODIMENTS

The present invention will now be described with reference to the accompanying figures, wherein numbered elements in the following written description correspond to like-numbered elements in the figures. The shaped antenna pattern of the present invention enables a single radar system with a single set of sensing elements to mitigate the number of sensors, as well as the number of sets of sensing elements per sensor, needed to cover multiple sensing zones. Multiple sensing zones are required for many current and future sensing applications, including those for vehicular active safety and autonomous driving. The present invention reduces the overall number and cost of the sensors per vehicle for these applications, as well as the cost and size of an individual sensor. Challenges and cost related to integration of a large number of sensors on a vehicle are also mitigated.

Figure 1:
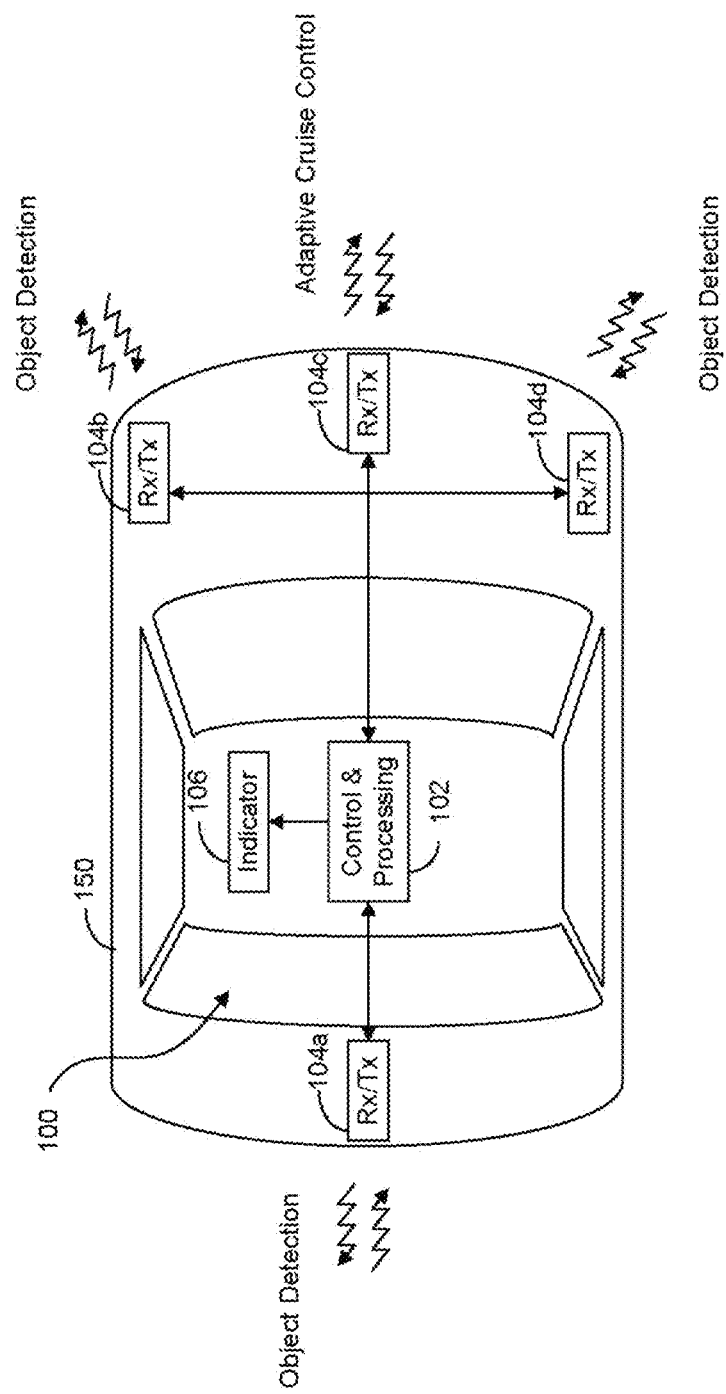
FIG. 1 is a plan view of an automobile equipped with one or more radar systems

FIG. 1 illustrates an exemplary radar system 100 configured for use in a vehicle 150. In an aspect of the present invention, a vehicle 150 may be an automobile, truck, or bus, etc. As illustrated in FIG. 1, the radar system 100 may comprise one or more transmitters and one or more receivers 104a-104d for a plurality of virtual radars. Other configurations are also possible. As illustrated in FIG. 1, the radar system 100 may comprise one or more receivers/transmitters 104a-104d, control and processing module 102 and indicator 106. Other configurations are also possible. FIG. 1 illustrates the receivers/transmitters 104a-104d placed to acquire and provide data for object detection and adaptive cruise control. The radar system 100 (providing such object detection and adaptive cruise control or the like) may be part of an Advanced Driver Assistance System (ADAS) for the automobile 150.

Figure 2A:
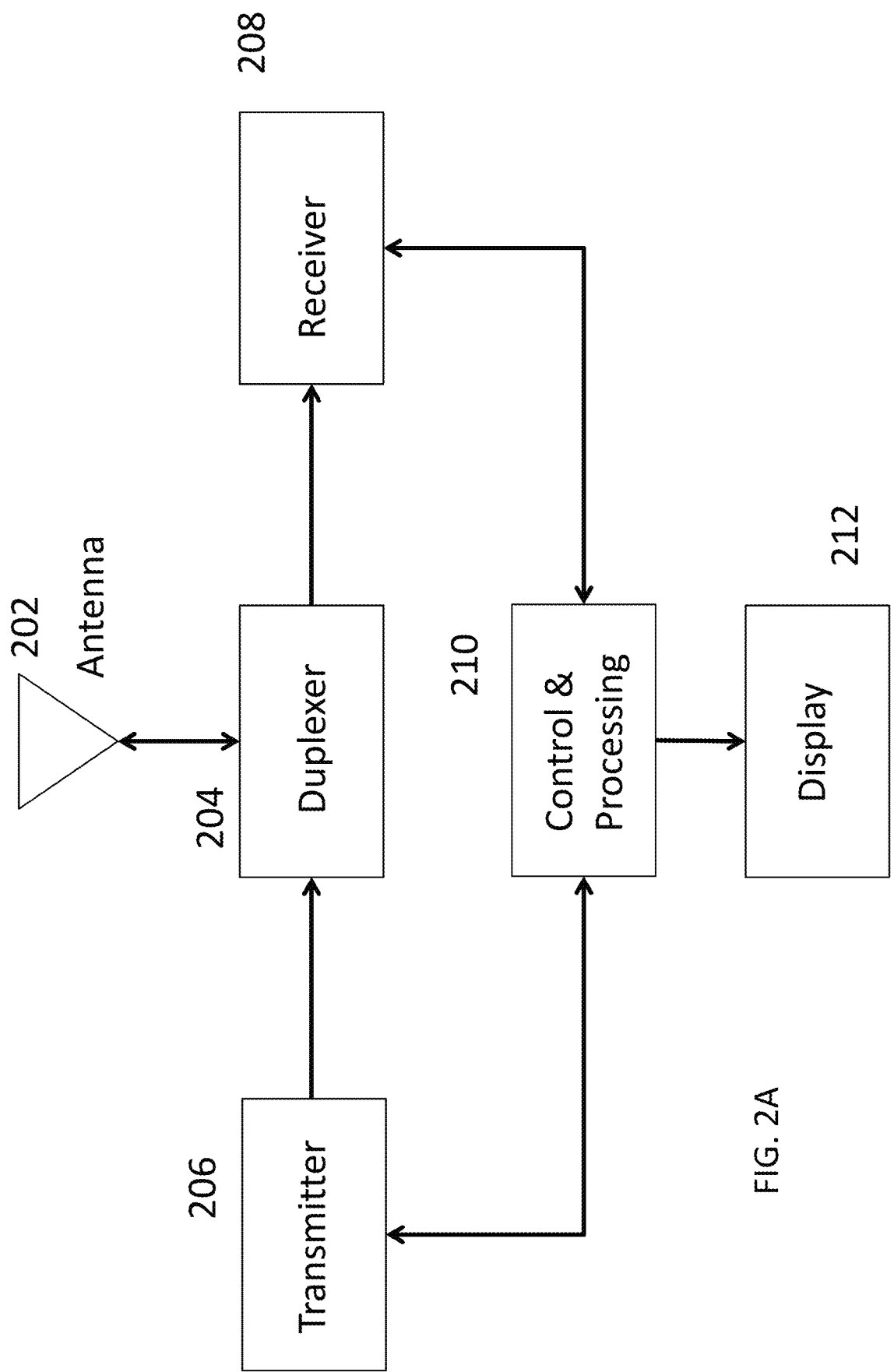
FIG. 2A and FIG. 2B are block diagrams of radar systems in accordance with the present invention.

FIG. 2A illustrates an exemplary radar system 200 with an antenna 202 that is time-shared between a transmitter 206 and a receiver 208 via a duplexer 204. As also illustrated in FIG. 2A, output from the receiver 208 is received by a control and processing module 210 that processes the output from the receiver 208 to produce display data for the display 212. The control and processing module 210 is also operable to produce a radar data output that is provided to other control units. The control and processing module 210 is also operable to control the transmitter 206.

Figure 2B:
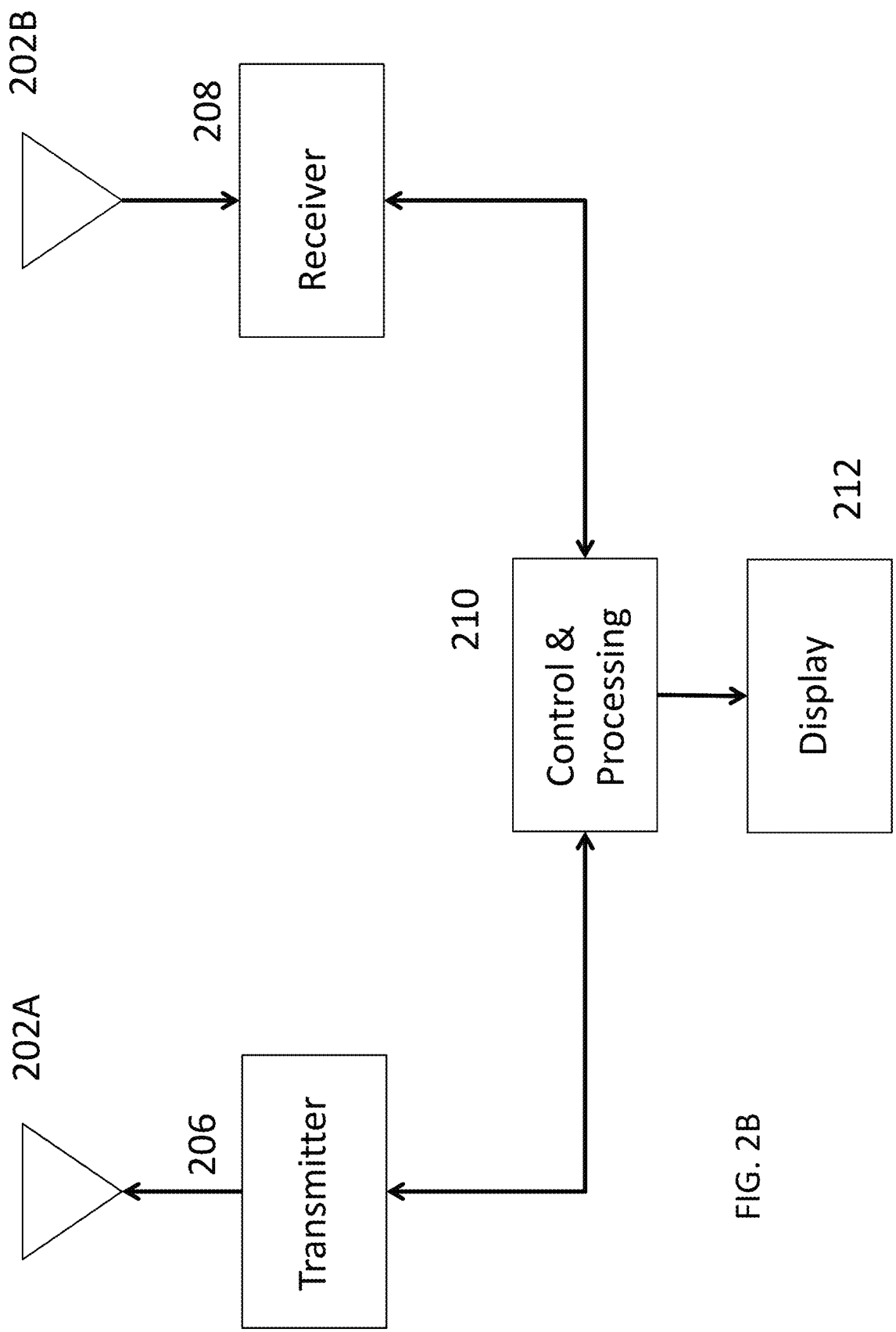

FIG. 2B illustrates an alternative exemplary radar system 250 with a pair of antennas 202a, 202b: an antenna 202a for the transmitter 206 and another antenna 202b for the receiver 208.

Figure 3:
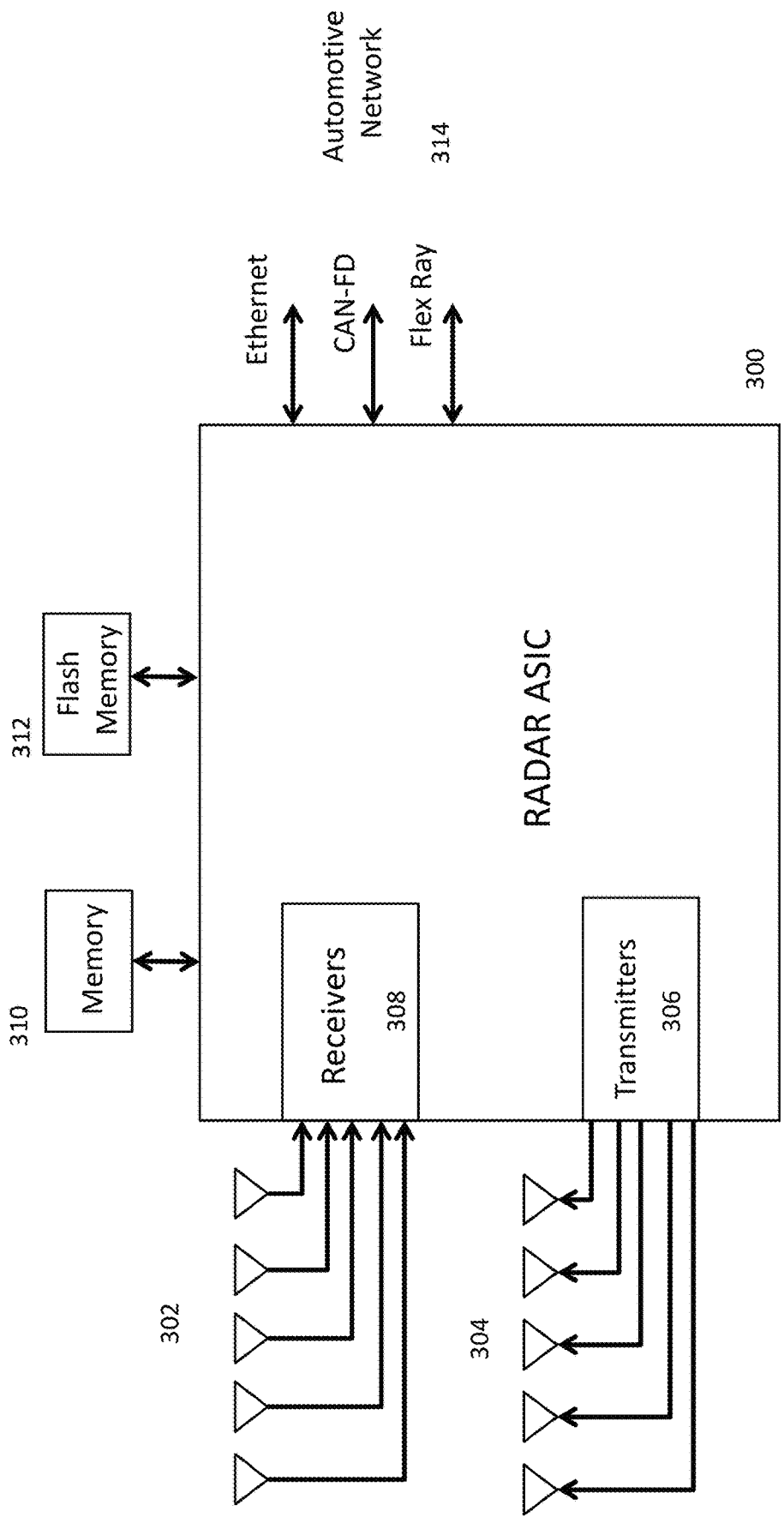
FIG. 3 is a block diagram illustrating a radar system with a plurality of receivers and a plurality of transmitters (MIMO radar) in accordance with the present invention.

An exemplary MIMO radar system is illustrated in FIG. 3. With MIMO radar systems, each transmitter signal is rendered distinguishable from every other transmitter by using appropriate differences in the modulation, for example, different digital code sequences. Each receiver correlates with each transmitter signal, producing a number of correlated outputs equal to the product of the number of receivers with the number of transmitters. The outputs are deemed to have been produced by a number of virtual receivers, which can exceed the number of physical receivers.

The radar sensing system of the present invention may utilize aspects of the radar systems described in U.S. Pat. Nos. 9,575,160 and/or 9,599,702, and/or U.S. patent applications, Ser. No. 15/481,648, filed Apr. 7, 2017, now U.S. Pat. No. 9,689,967, Ser. No. 15/416,219, filed Jan. 26, 2017, now U.S. Pat. No. 9,772,397, and/or Ser. No. 15/292,755, filed Oct. 13, 2016, now U.S. Pat. No. 9,753,121, and/or U.S. provisional applications, Ser. No. 62/382,857, filed Sep. 2, 2016, Ser. No. 62/381,808, filed Aug. 31, 2016, Ser. No. 62/327,003, filed Apr. 25, 2016, Ser. No. 62/327,004, filed Apr. 25, 2016, Ser. No. 62/327,005, filed Apr. 25, 2016, Ser. No. 62/327,006, filed Apr. 25, 2016, Ser. No. 62/327, 015, filed Apr. 25, 2016, Ser. No. 62/327,016, filed Apr. 25, 2016, Ser. No. 62/327,017, filed Apr. 25, 2016, which are all hereby incorporated by reference herein in their entireties.

Shaped Antenna Patterns:

FIG. 3 illustrates a radar system 300 with multiple antennas 302, 304, transmitters 306 and receivers 308. Using multiple antennas allows a radar system 300 to determine the angle of objects/targets in the environment. Depending on the geometry of the antenna system 300, different angles (e.g., with respect to the horizontal or vertical) can be determined. The radar system 300 may be connected to a network via an Ethernet connection or other types of network connections 314. The radar system 300 includes memory 310, 312 to store software used for processing the received radio signals to determine range, velocity, and location of objects/targets in the environment. Memory may also be used to store information about objects/targets in the environment.

Current and future vehicular applications related to active safety and autonomous driving envision long, medium, and short range sensing zones with unique requirements in terms of detection range and horizontal field of view (FOV). Current sensing solutions include separate long range, medium range, and/or short range sensors, resulting in high cost and challenges in vehicle integration. Other solutions including providing different sets of sensing elements within a single sensor, with the different sets of sensing elements covering different sensing zones. Multiple sensing elements increase the size and cost of the individual sensor.

Other current solutions for a single sensor with multiple sensing zones include the use of the radar antenna pattern main lobe to cover a long range, narrow FOV sensing zone and antenna pattern sidelobes to cover medium range and/or short range sensing zones with wider FOV. The use of antenna pattern sidelobes can often be insufficient in terms of detection range for the medium range sensing zone. Further, the nulls inherent in the antenna sidelobe structure may lead to unacceptable holes in the coverage pattern.

Still another solution for a single sensor includes the use of a phased array antenna with flexible gain, beamwidth, and scan angle. This solution provides the most flexibility, but is typically too expensive for vehicular radar.

Figure 4:
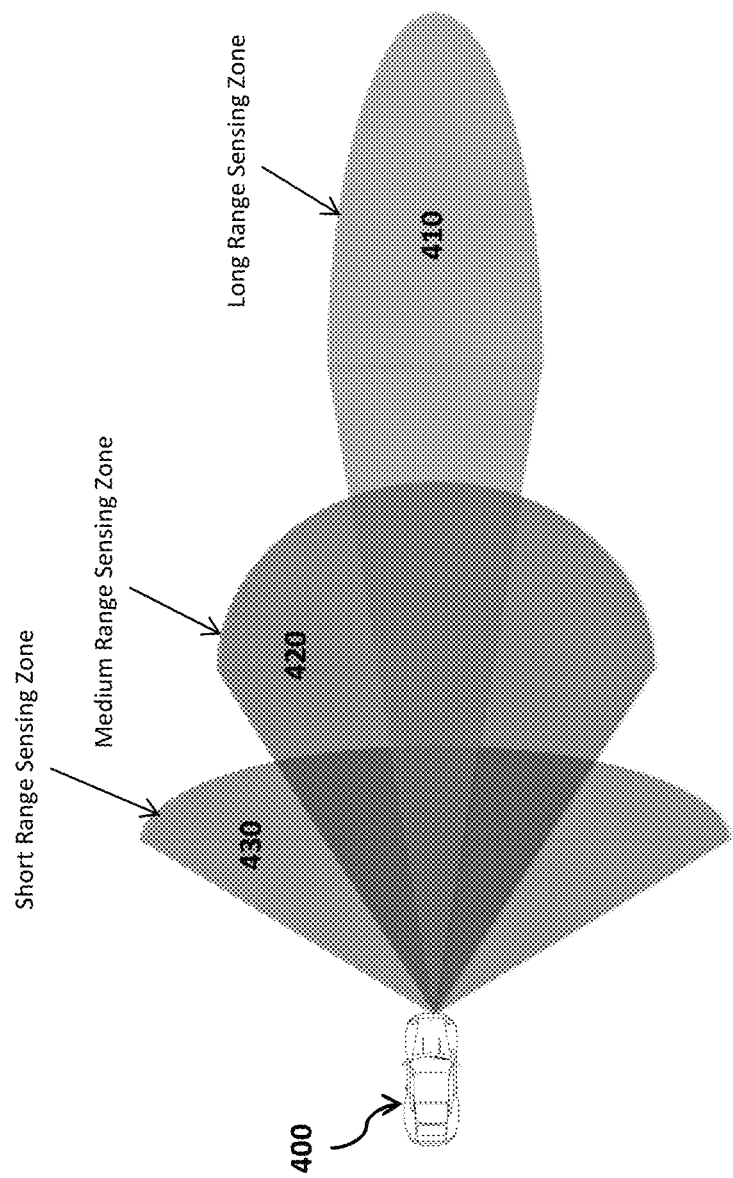
FIG. 4 is a plan view of an automobile equipped with a radar system and exemplary multiple sensing zones for vehicular applications.

The shaped antenna pattern of the present invention enables a single radar system with a single set of sensing elements to mitigate the number of sensors, as well as the number of sets of sensing elements per sensor, needed to cover multiple sensing zones. FIG. 4 illustrates multiple exemplary sensing zones generally specified for vehicular applications. Three different sensing zones are often specified, for example, a long range zone 410, a medium range zone 420, and a short range zone 430. Each sensing zone may be specified with a different range and horizontal angle field of view (FOV). Different angle resolutions, angle accuracies, and update rates for each sensing zone may be specified as well. In FIG. 4, the exemplary sensing zones are illustrated for the region forward of a host vehicle 400.

Figure 5A:
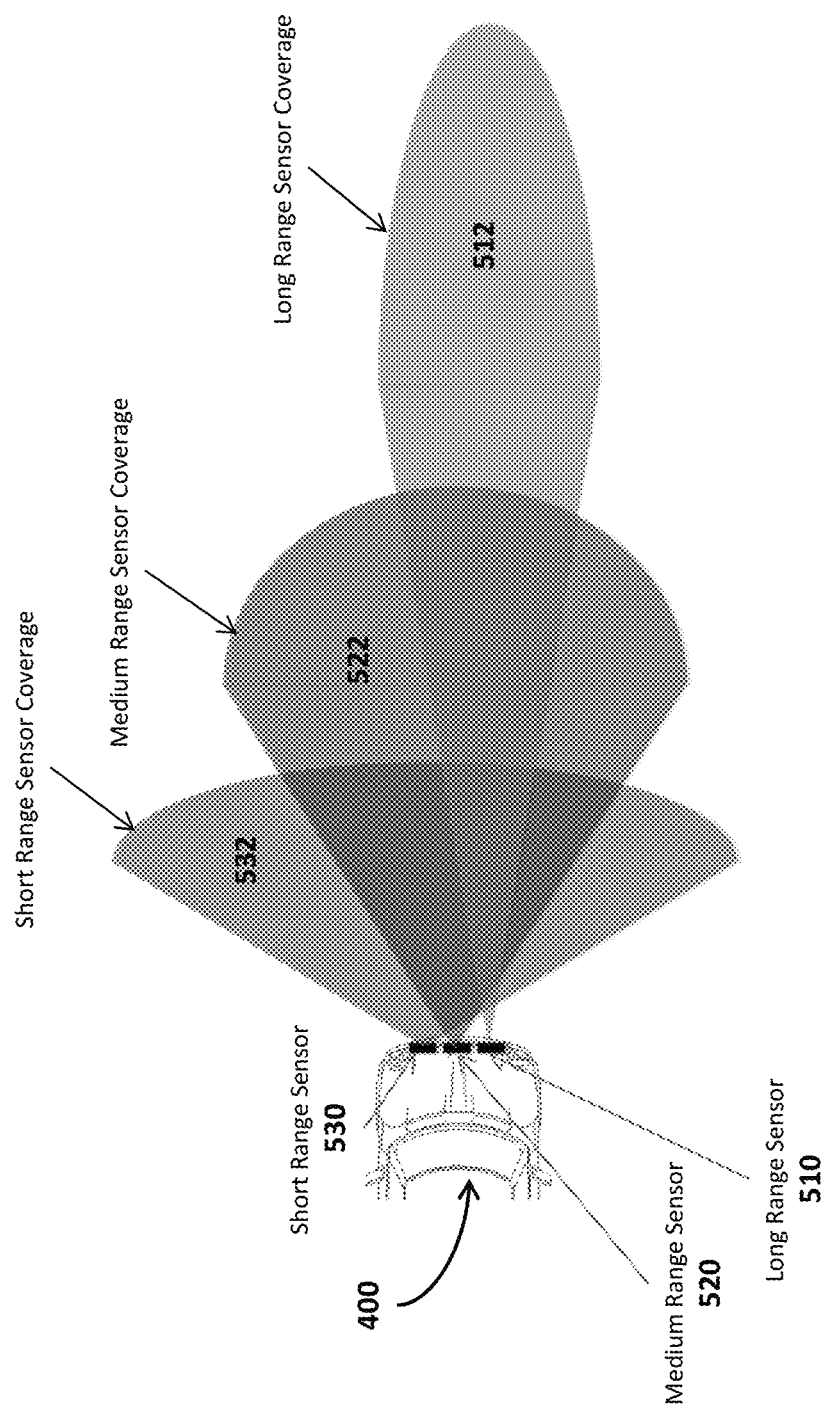
FIG. 5A, FIG. 5B, and FIG. 5C are plan views illustrating sensing solutions for the sensing zones illustrated in FIG. 4.
Figure 5B:
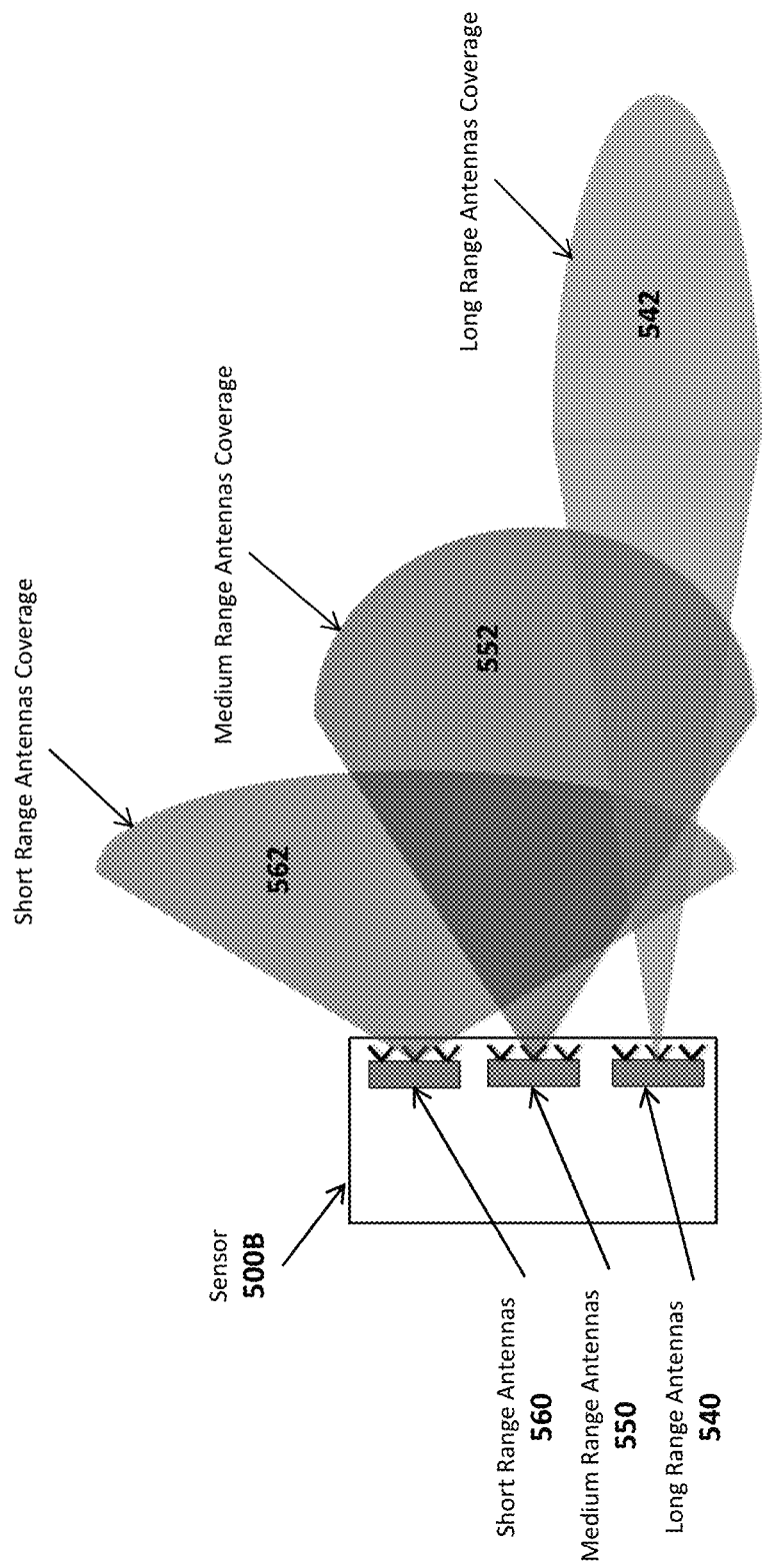
Figure 5C:
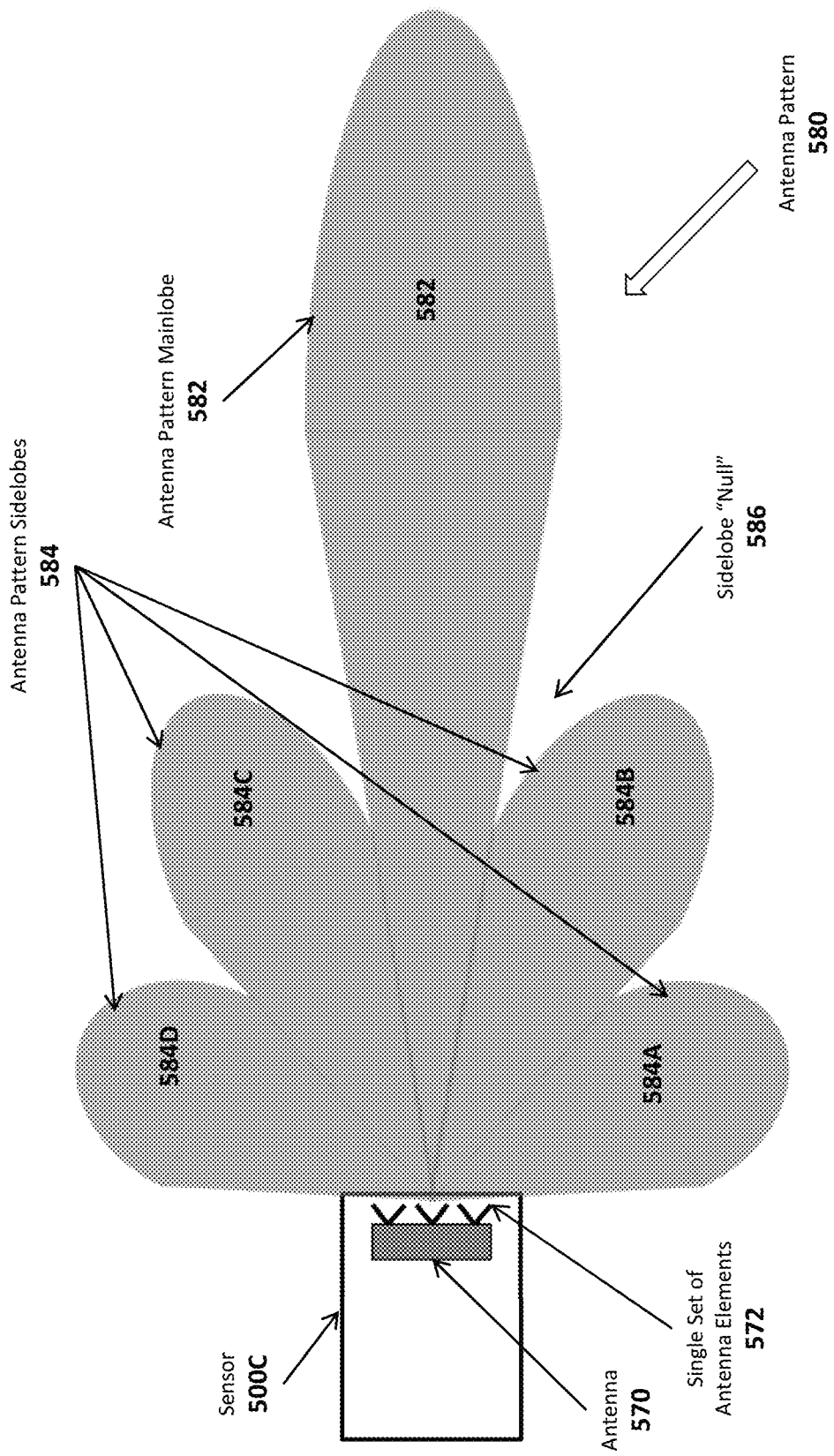

FIGS. 5A, 5B, and 5C illustrate exemplary sensing solutions for the sensing zones illustrated in FIG. 4. FIG. 5A illustrates three sensors mounted on the front of the host vehicle 400. As illustrated in FIG. 5A, a long range sensor 510, a medium range sensor 520, and a short range sensor 530 are provided, such that a sensor is provided for each sensing zone. The respective regions covered by each sensor are illustrated as well, with a long range sensor coverage 512 for the long range sensor 510, a medium range sensor coverage 522 for the medium range sensor 520, and a short range sensor coverage 532 for the short range sensor 530.

FIG. 5B illustrates a single sensor 500B with three sets of sensing elements: (i) long range antennas 540, (ii) medium range antennas 550, and (iii) short range antennas 560, each set assigned to a different sensing zone. The respective regions covered by each set of antennas are shown as well, with a long range antennas coverage 542 for the long range antennas 540, a medium range antennas coverage 552 for the medium range antennas 550, and a short range antennas coverage 562 for the short range antennas 560.

FIG. 5C illustrates a single sensor 500C with antenna 570 consisting of a single set of antenna elements 572. The antenna 570 forms an antenna pattern 580 with a mainlobe 582 and sidelobes 584 used to cover the three sensing zones. Note the presence of "nulls" in the sidelobe structure, as illustrated by the exemplary sidelobe null 586. Sidelobe nulls are characterized by substantially reduced antenna gain compared to the nominal antenna gain in the sidelobe region. These sidelobe nulls result in substantially reduced detection range compared to the nominal detection range over the sidelobe region.

Figure 6A:
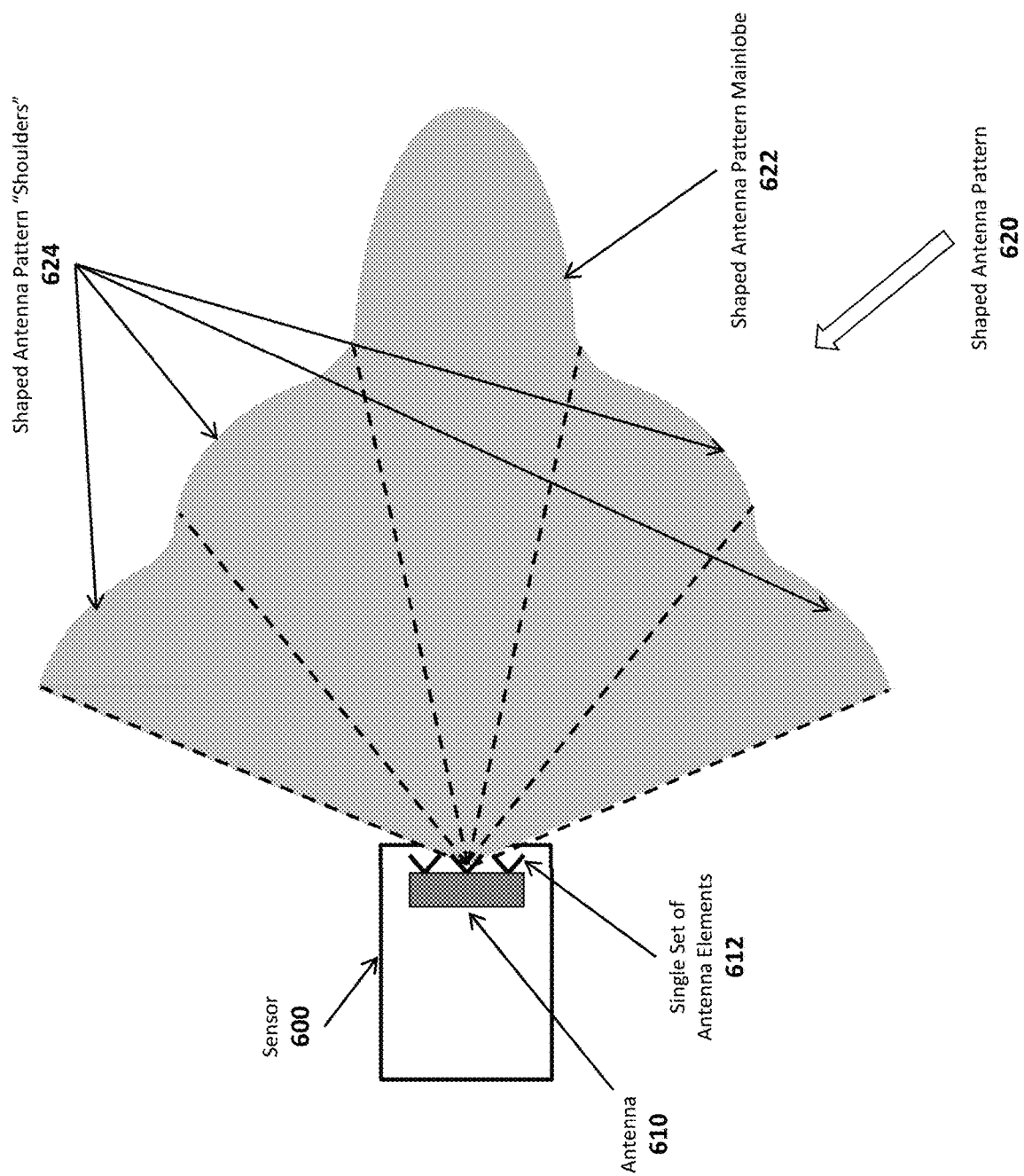
FIG. 6A is a block diagram of an exemplary sensor and a corresponding shaped antenna pattern in accordance with the present invention.
Figure 6B:
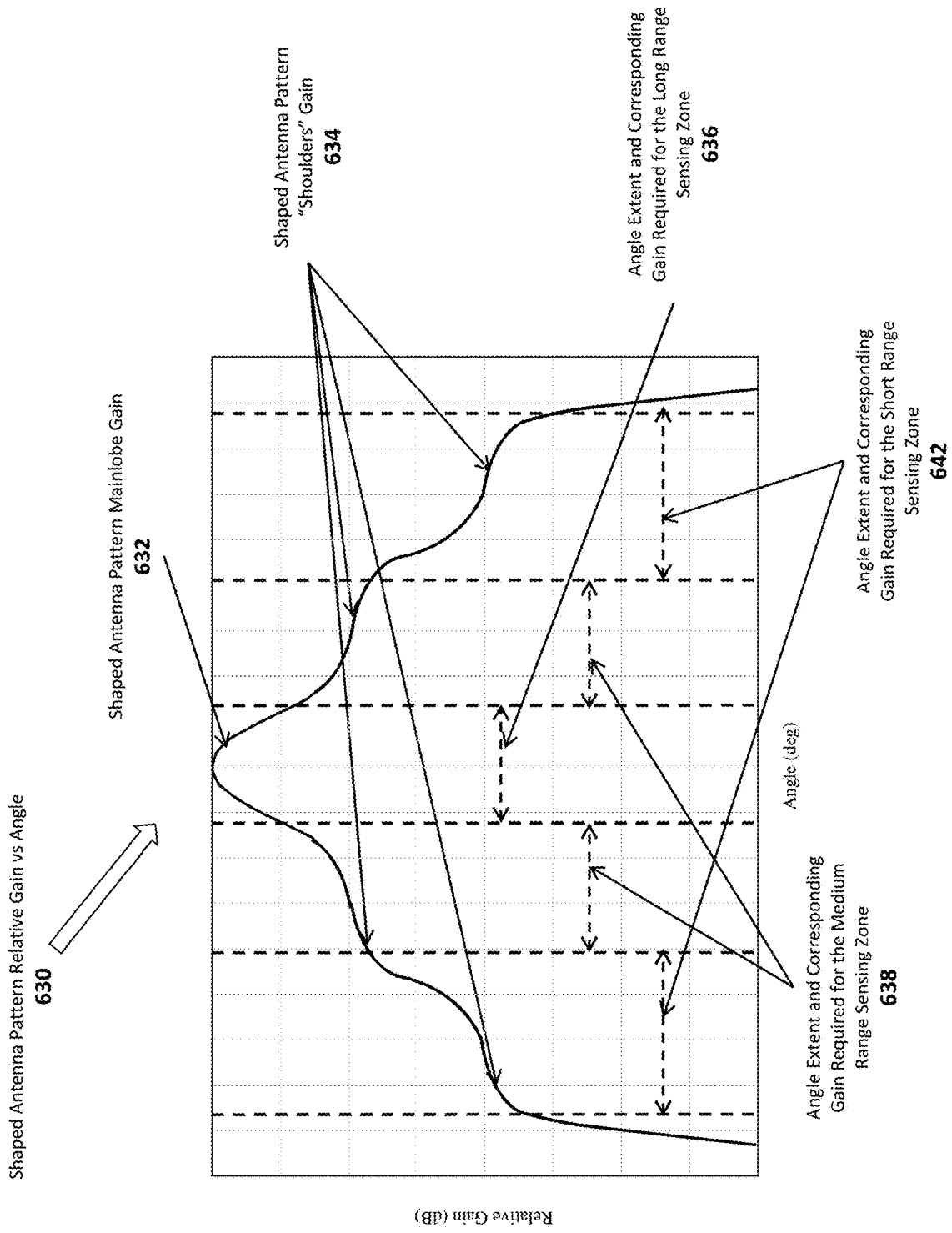
FIG. 6B is a graph illustrating relative gain and angle extent of an exemplary shaped antenna pattern in accordance with the present invention.

FIGS. 6A and 6B illustrate a single sensor embodiment of the present invention, where a single sensor 600 is illustrated with an antenna 610 consisting of a single set of antenna elements 612. The antenna 610 forms a shaped antenna pattern 620 with a mainlobe 622 and "shoulders" 624 to cover the sensing zones illustrated in FIG. 4 without nulls or holes in the coverage. FIG. 6B is a graph illustrating the relative gain and angle extent of the shaped antenna pattern 630 for the mainlobe 632 and "shoulders" 634 portions of the pattern. The antenna gain and horizontal FOV (angle extent) of the mainlobe 632 and "shoulders" 634 are tailored to the antenna gain and horizontal FOVs (angle extents) required for the different sensing zones (636, 638, 642). The resulting antenna pattern is smooth without nulls or holes in the pattern.

Figure 7A:
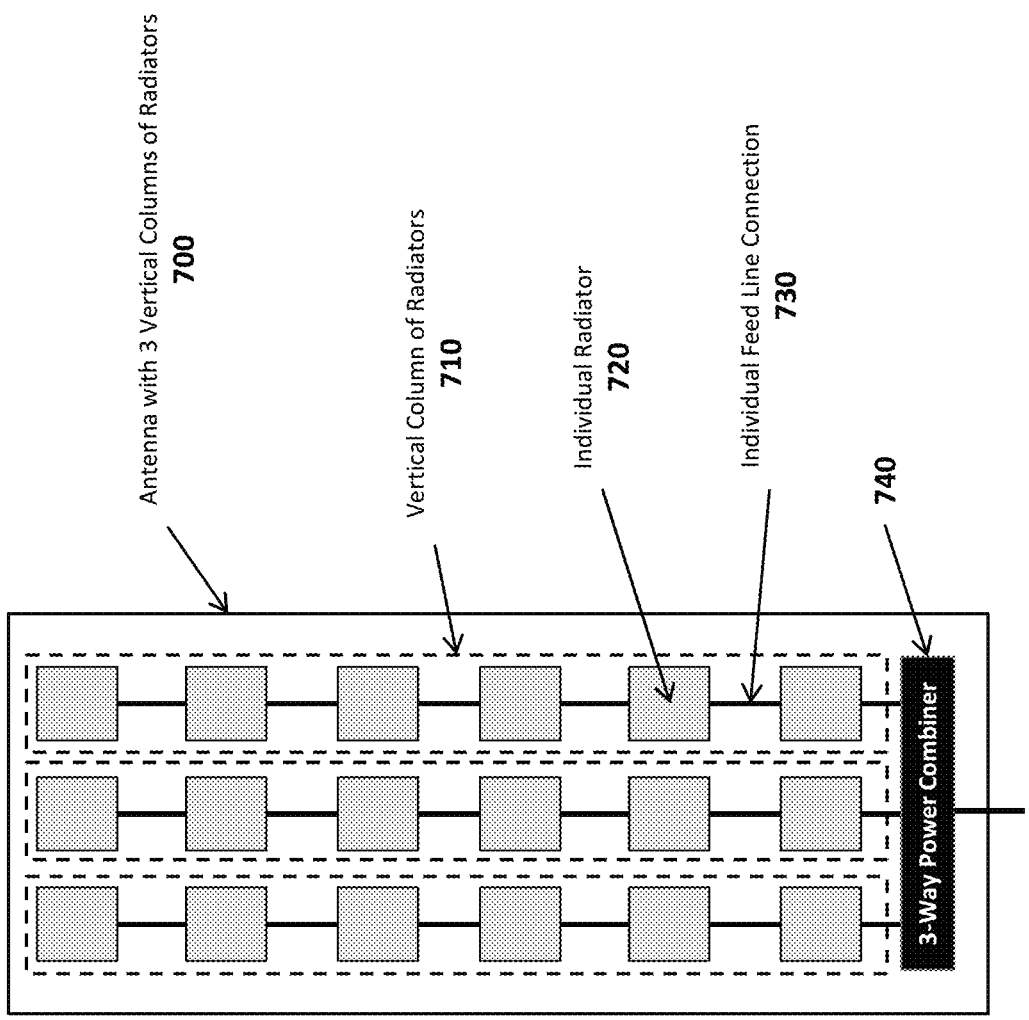
FIG. 7A is a block diagram illustrating an exemplary antenna in accordance with the present invention.
Figure 7B:
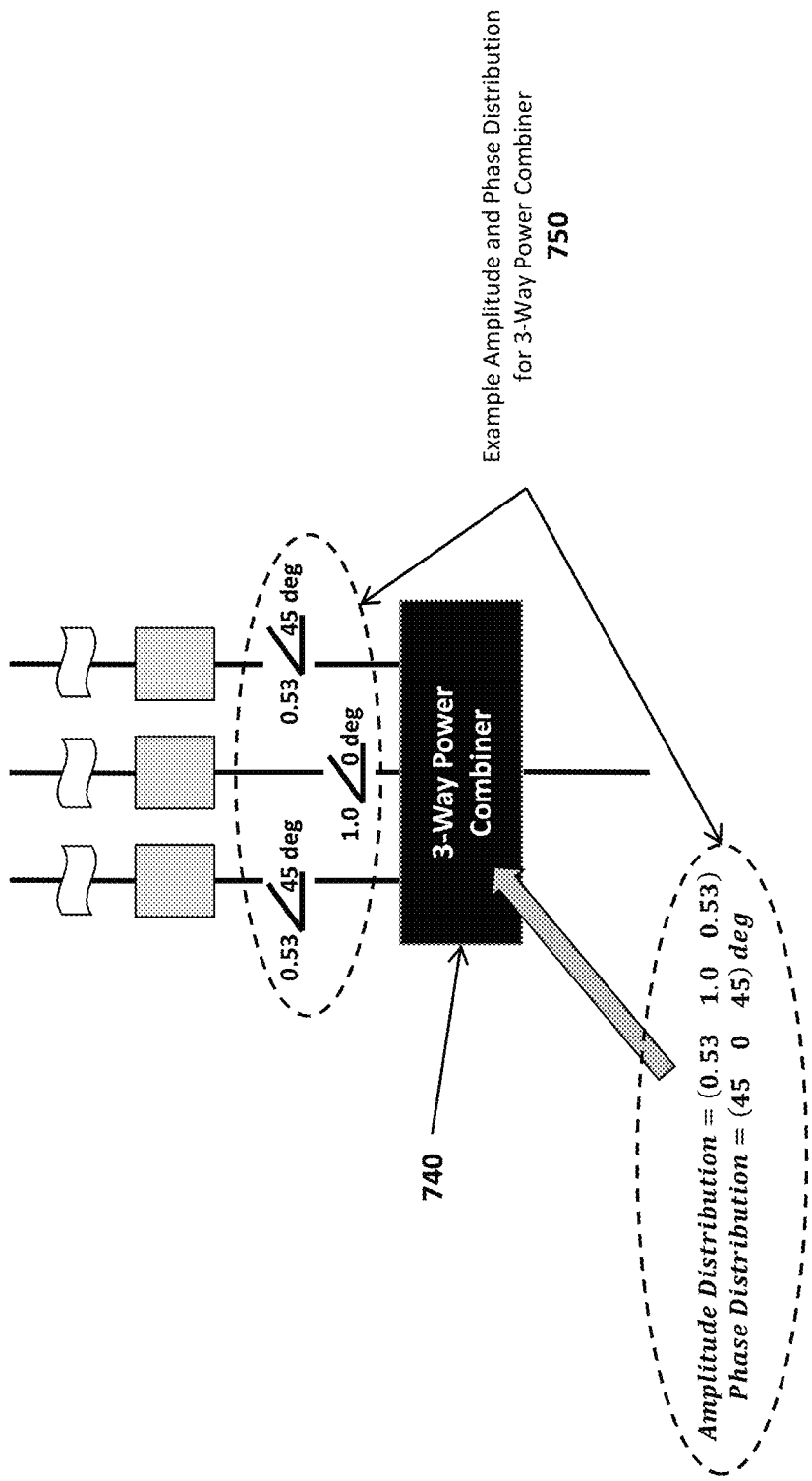
FIG. 7B is a block diagram illustrating exemplary phase and amplitude distribution implemented in a 3-way combiner of the antenna illustrated in FIG. 7A, in accordance with the present invention.
Figure 7C:
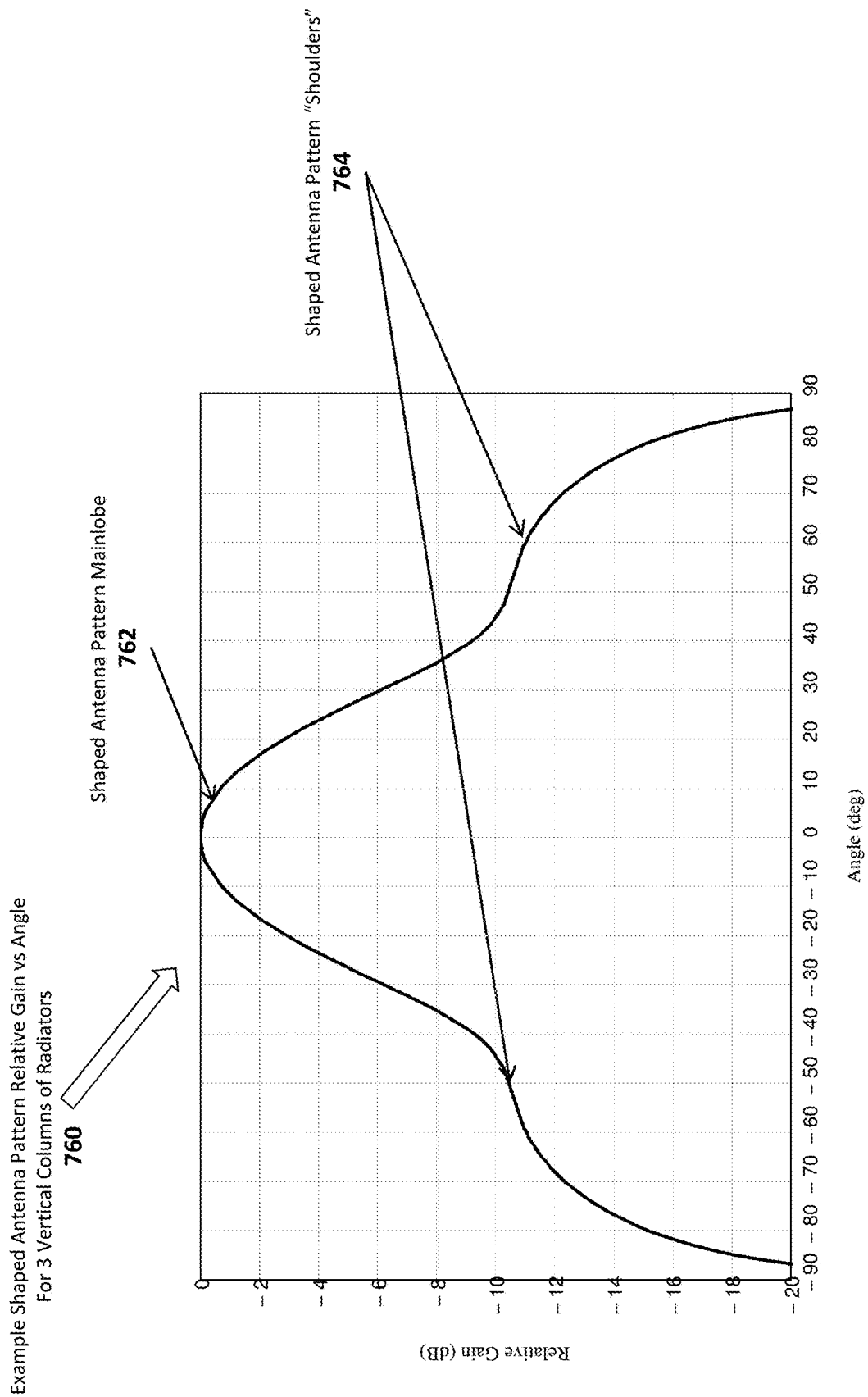
FIG. 7C is a graph illustrating an exemplary shaped antenna pattern for the phase and amplitude distribution of FIG. 7B, in accordance with the present invention.

FIGS. 7A, 7B, and 7C illustrate an exemplary embodiment of the present invention that uses a transmit and/or receive antenna 700 consisting of three linear arrays of radiators 710 that are arranged as vertical columns of radiators 710, as shown in FIG. 7A. The radiators may also be referred to as elements. The three vertical columns of radiators are combined into a single antenna port using a three-way power combiner 740. The transmit and/or receive antennas with linear arrays of radiators or elements can be implemented using well known antenna structures and fabrication techniques, including multi-layer printed circuit board antennas with, for example, microstrip feed lines and patch radiators, substrate integrated waveguide (SIW) feed lines, and SIW slotted radiators, coplanar waveguide feed lines with SIW slotted radiators, or suitable combinations thereof. Other common types of feed and radiator structures can be used as well. The antenna illustrated in FIG. 7A would typically be recognized to represent patch radiators 720 connected by microstrip feed lines 730.

The shaped antenna pattern of the present invention is realized in the horizontal dimension by an appropriate phase and amplitude distribution in the power combiner 740. FIG. 7B illustrates an example phase and amplitude distribution 750 implemented in the 3-way power combiner 740 that produces the exemplary shaped antenna pattern 760 illustrated in FIG. 7C. When using three linear arrays of radiators arranged as vertical columns of radiators 710 with a three-way power combiner 740, the shaped horizontal pattern is limited to two shoulders 764, as illustrated in FIG. 7C. FIG. 7C illustrates that the higher gain mainlobe region 762 of the shaped pattern typically covers long and/or medium range sensing zones. The relative gain and width of the shoulder region can be adjusted by the phase and amplitude distribution in the power combiner to cover medium and/or short range sensing zones. The horizontal profile of the shaped antenna pattern of the present invention can be further optimized to the specified sensing zones if greater than three vertical columns of radiators are used for an individual transmit or receive antenna. When using more than three vertical columns of radiators, the number of branches in the power combiner is correspondingly increased resulting in more degrees of freedom to adjust the phase and amplitude distribution for additional control of the horizontal antenna pattern profile.

Figure 8A:
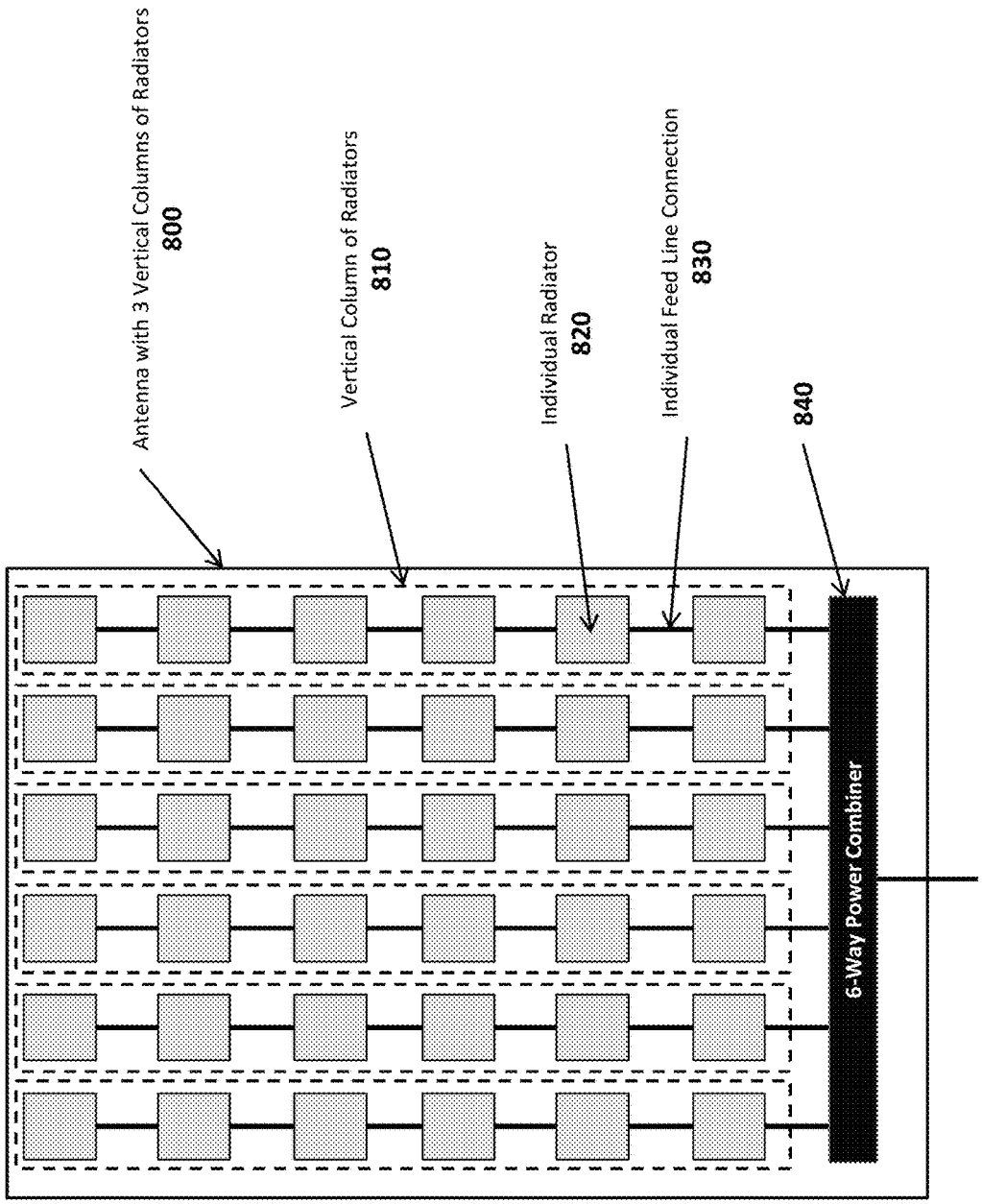
FIG. 8A is a block diagram illustrated an exemplary antenna in accordance with the present invention.
Figure 8B:
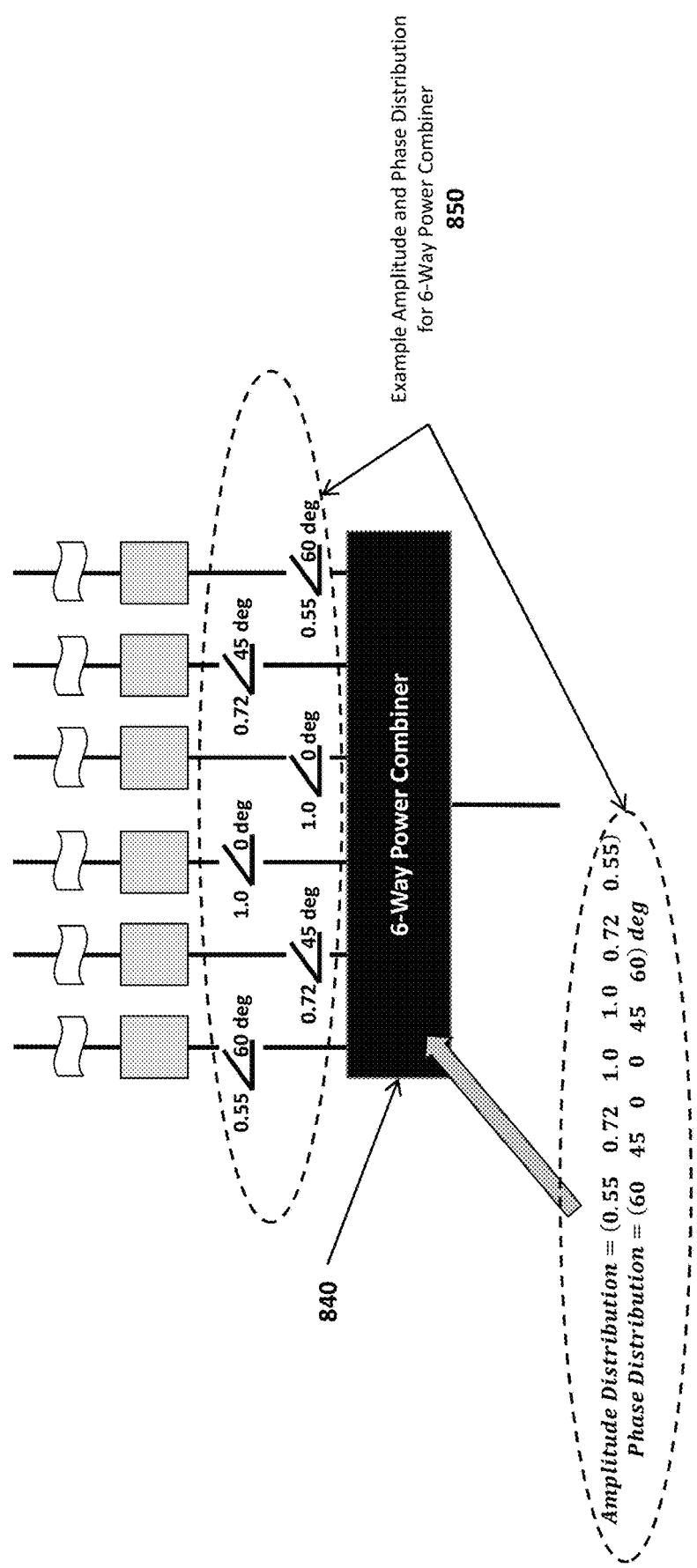
FIG. 8B is a block diagram illustrating exemplary phase and amplitude distribution implemented in a 6-way combiner of the antenna illustrated in FIG. 8A, in accordance with the present invention.
Figure 8C:
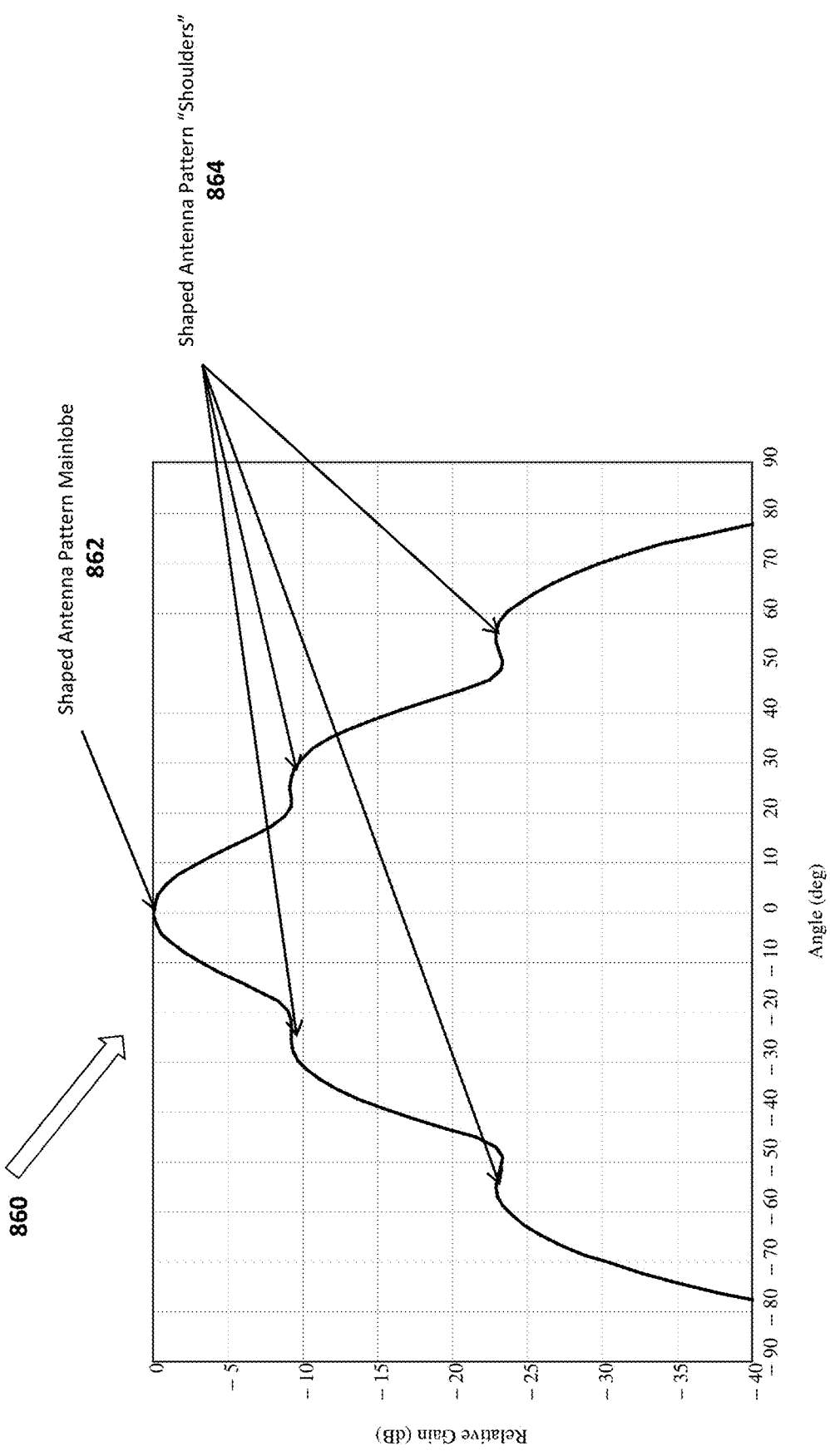
FIG. 8C is a graph illustrating an exemplary shaped antenna pattern for the phase and amplitude distribution of FIG. 8B, in accordance with the present invention.

FIGS. 8A, 8B and 8C illustrate an exemplary embodiment of the present invention using a transmit and/or receive antenna 800 composed of six linear arrays of radiators arranged as vertical columns of radiators 810 and a six-way power combiner 840, as illustrated in FIG. 8A. FIG. 8A also illustrates that each column of radiators 810 comprises a series of individual radiators 820 interconnected by feedline connections 830. The exemplary amplitude and phase distribution 850, illustrated in FIG. 8B, produces the shaped antenna pattern 860 illustrated in FIG. 8C. As illustrated in FIG. 8C, the particular amplitude and phase distribution 850 produces an exemplary antenna pattern shape 860 with a shaped antenna pattern mainlobe 862 and shaped antenna pattern shoulders 864. Note that there are a pair of shoulders 864 for each side of the antenna pattern.

MIMO radar systems generally use a set of multiple transmit and receive antennas, as illustrated in FIG. 3. In a preferred embodiment using the present invention with MIMO radar, each transmit and receive antenna incorporates the same or common shaped pattern, for example, the shaped antenna pattern illustrated in FIG. 7C. In another embodiment, the individual antennas may use different shaped antenna patterns. For example, a transmit antenna may use a first shaped antenna pattern (such as shown in FIG. 7C) and a receive antenna may use a second shaped antenna pattern (such as shown in FIG. 8C) that is different from the first shaped antenna pattern.

Figure 9:
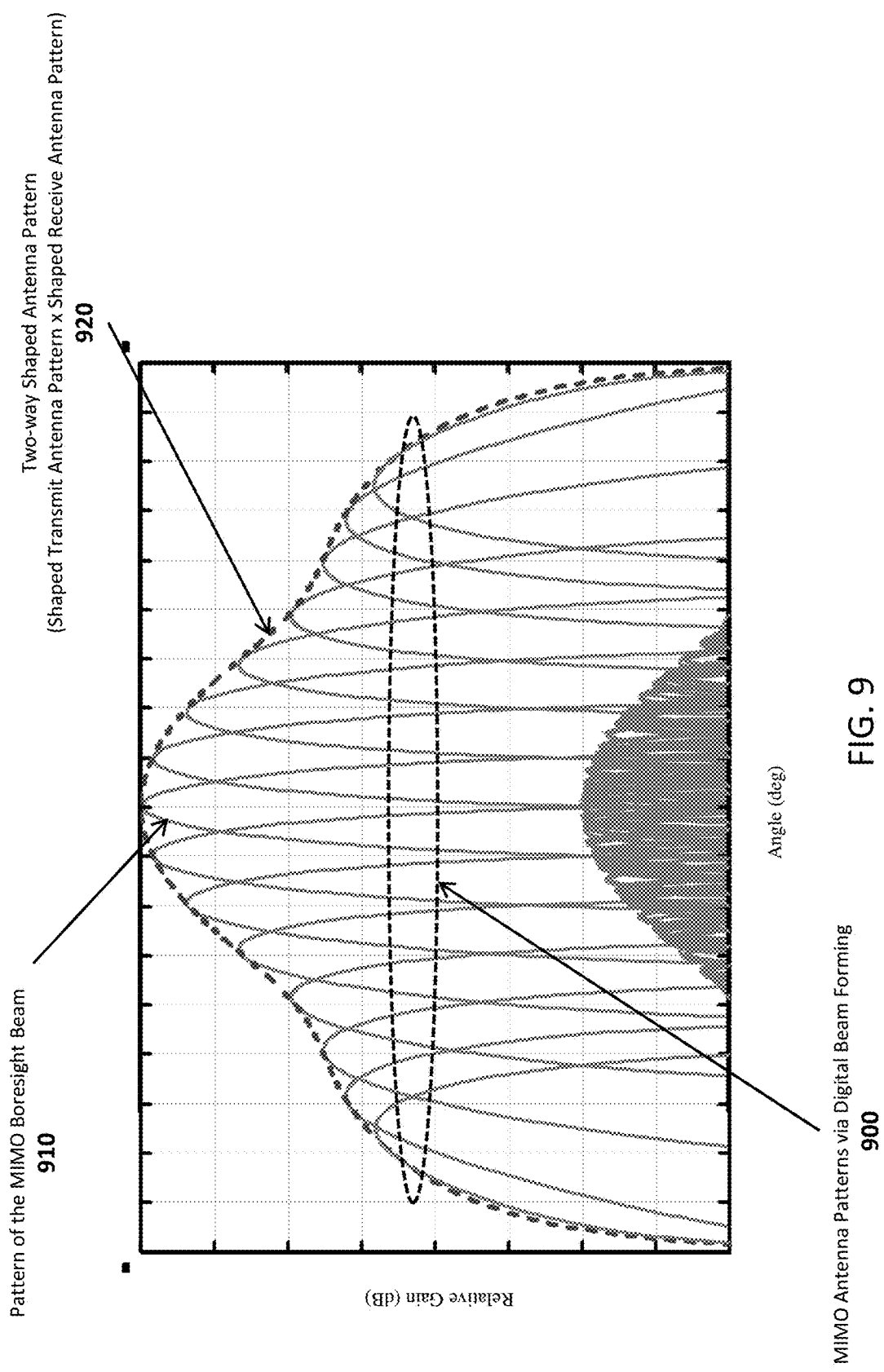
FIG. 9 is a graph illustrating exemplary MIMO radar antenna patterns, in accordance with the present invention.

FIG. 9 illustrates MIMO radar antenna patterns 900 when using the present invention within a MIMO radar structure incorporating digital beamforming on receive. MIMO radar digital beamforming is implemented in the signal processing software to combine signals associated with selected groups of transmit and receive antennas. The digital beamforming process produces multiple narrow beams 900 spread across angle with a peak gain that follows the envelope of the two-way (transmit×receive) shaped antenna pattern 920, where the x-axis of the graph is the angle in degrees and the y-axis of the graph is relative gain (dB). Each individual lobe in FIG. 9 represents the antenna pattern of an individual MIMO beam. As an example, the boresight beam 910 and a two-way shaped antenna pattern (shaped transmit antenna pattern×shaped receive antenna pattern) are indicated in FIG. 9.

Figure 10A:
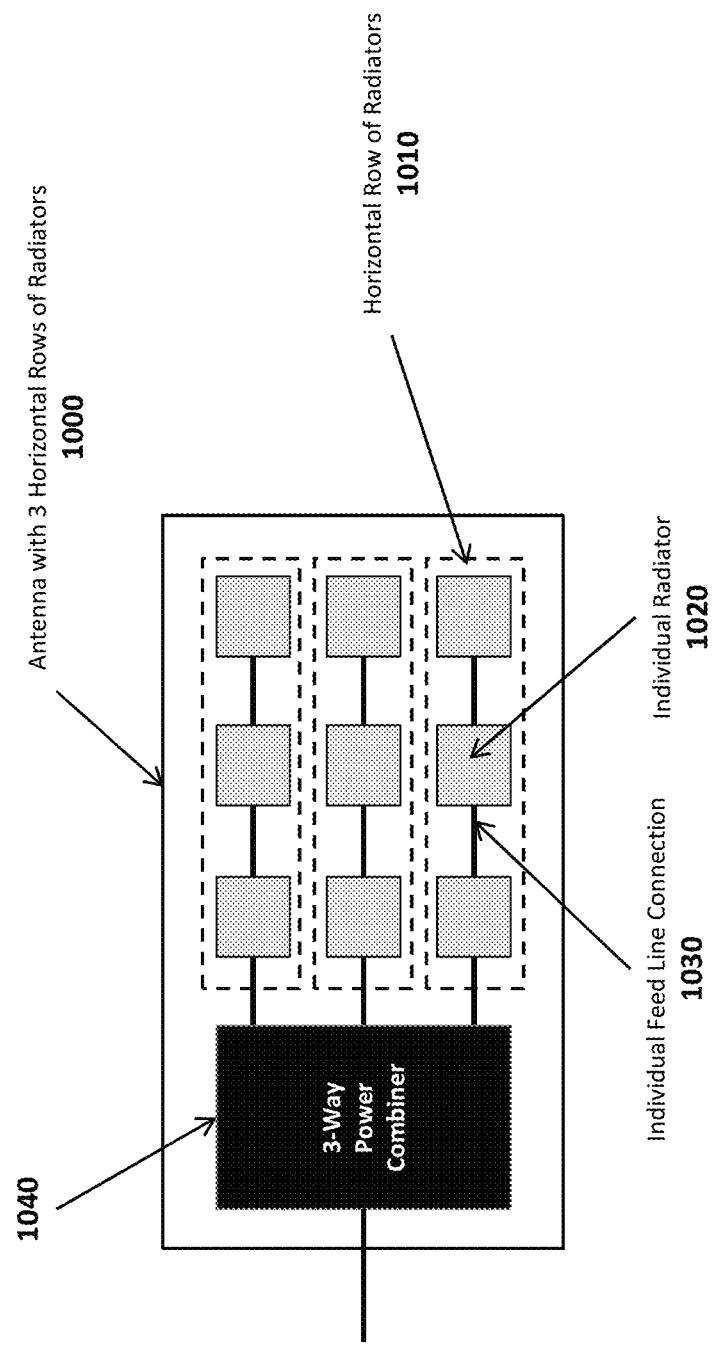
FIG. 10A is a block diagram illustrating an exemplary antenna for shaping an antenna pattern in the vertical dimension, in accordance with the present invention.

The exemplary embodiments of the present invention are not constrained to shaping of the horizontal antenna pattern tailored to specified horizontal sensing zones. For example, the present invention can be applied to shape the antenna pattern in the vertical dimension tailored to specified vertical sensing zones by using transmit and/or receive antennas composed of multiple horizontal rows of radiators combined into a single antenna port using a power combiner. As an example, FIG. 10A illustrates an exemplary antenna 1000 arranged to shape the antenna pattern in the vertical dimension using three linear arrays of radiators arranged as horizontal rows of radiators 1010 and a 3-way power combiner 1040. In a manner analogous to shaping the horizontal antenna pattern, illustrated in FIGS. 7B and 7C, a vertical antenna pattern is shaped by an appropriate amplitude and phase distribution implemented in the 3-way power combiner 1040.

Figure 10B:
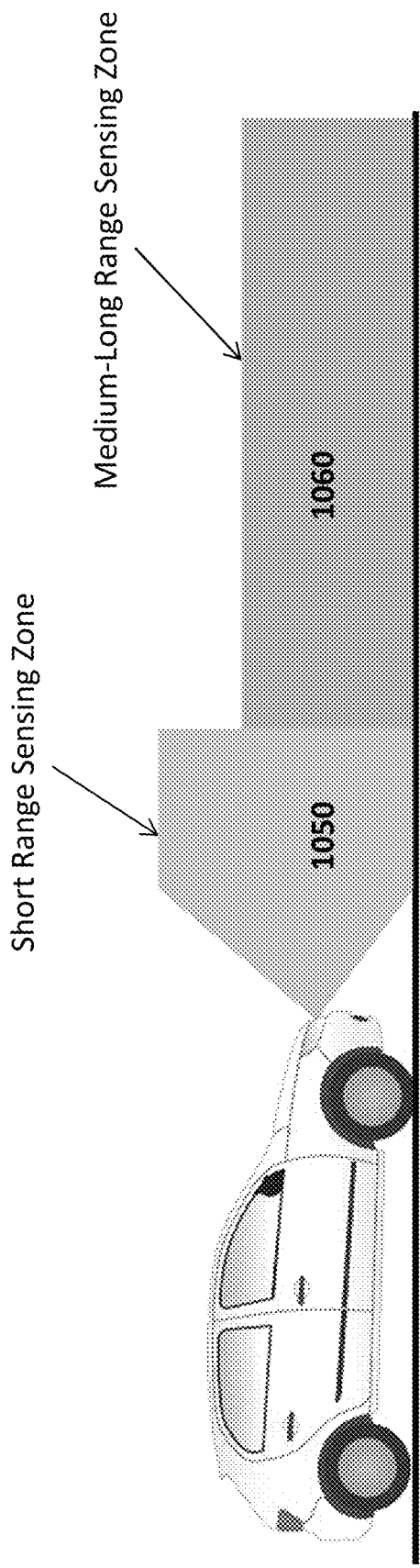
FIG. 10B is a diagram illustrating vertical sensing zones relative to a road surface.

Vertical shaping of the antenna pattern may be appropriate, for example, when the specified vertical FOV and detection range varies substantially for long range, medium range and/or short range objects/targets. This is often the case for vehicular radar, as illustrated in FIG. 10B. Without vertical pattern shaping, the vertical extent of the mainlobe may need to be broadened for acceptable coverage at short range resulting in reduced detection range for long range objects and increased susceptibility to unwanted detection of overhead and road surface objects.

Figure 11:
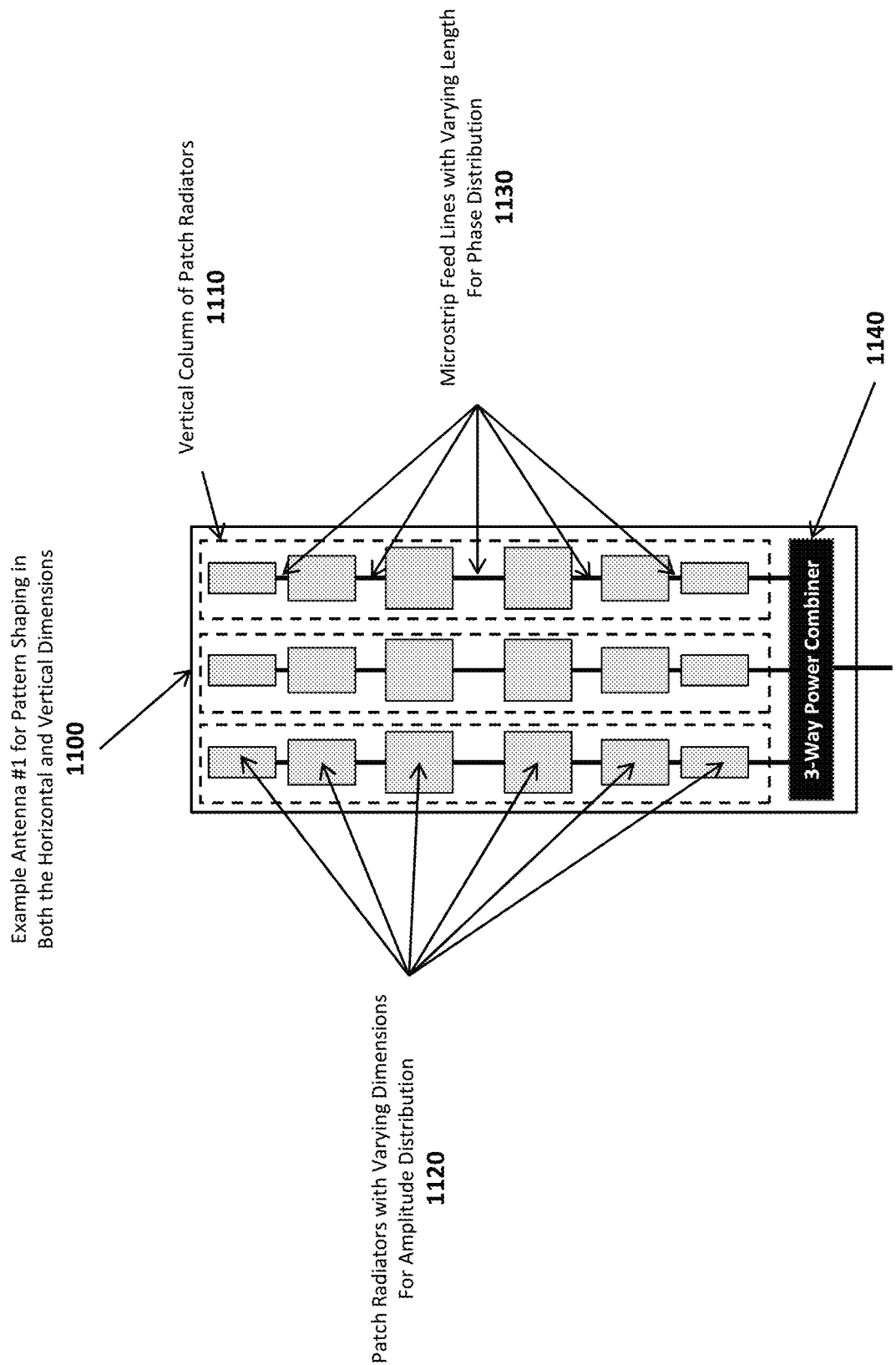
FIG. 11 is a block diagram illustrating an exemplary antenna with patch radiators of varying dimensions for shaping an antenna pattern in both the horizontal and vertical dimensions, in accordance with the present invention.
Figure 12:
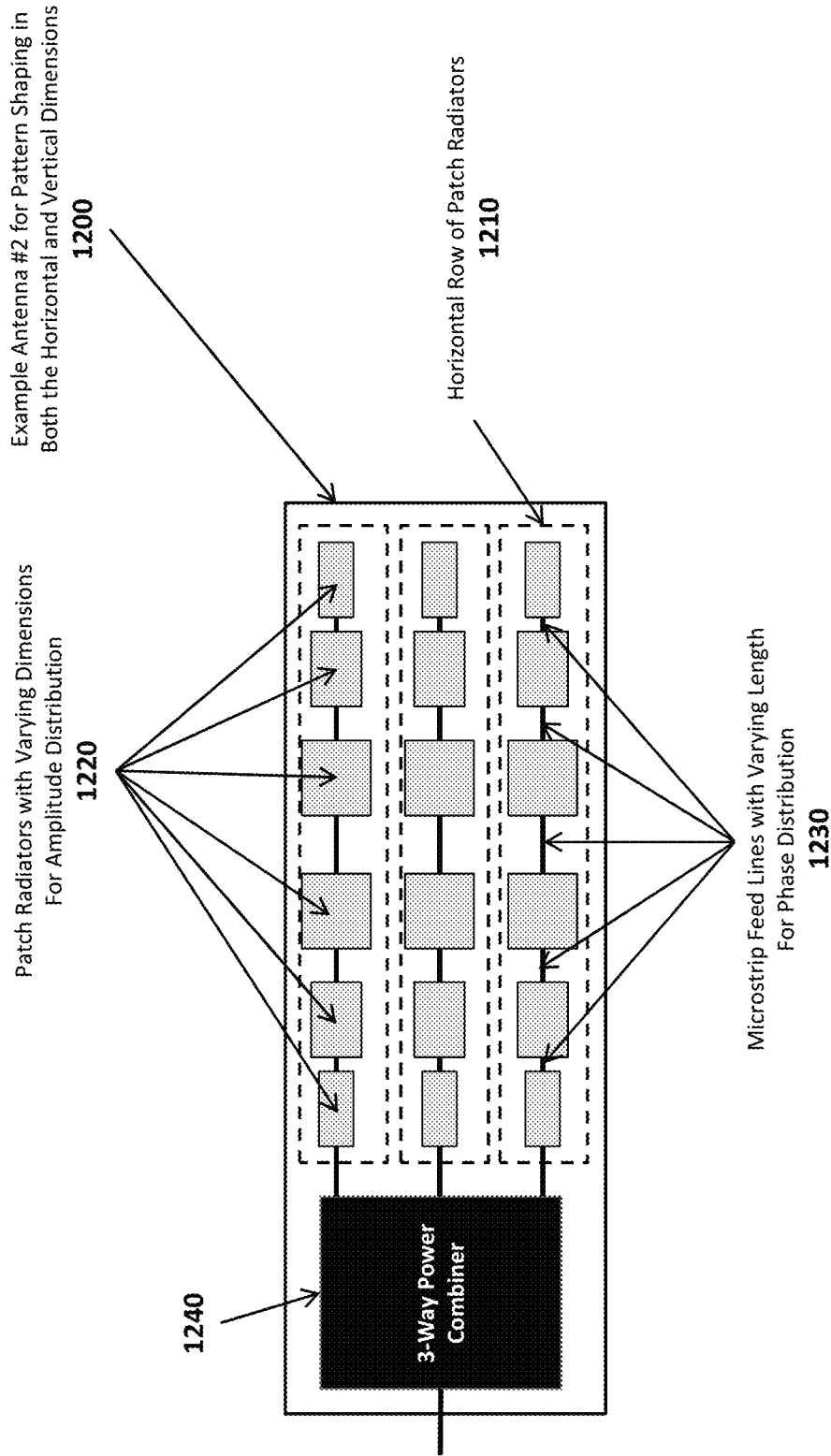
FIG. 12 is a block diagram illustrating an exemplary antenna with patch radiators of varying dimensions for shaping an antenna pattern in the both the horizontal and vertical dimensions, in accordance with the present invention.

The present invention is also not constrained to pattern shaping in only a single dimension. FIGS. 11 and 12 illustrate pattern shaping in two dimensions, horizontal and vertical, according to an embodiment of the present invention using transmit and/or receive antennas with multiple linear arrays of radiators arranged as either vertical columns of radiators 1100 or horizontal rows of radiators 1200 connected using a power combiner 1140, 1240, with an appropriate phase and amplitude distribution, to shape the antenna pattern in one dimension. In FIG. 11, the power combiner 1140 shapes the antenna pattern in the horizontal dimension, while in FIG. 12, the power combiner 1240 shapes the antenna in the vertical dimension.

To shape an antenna pattern in the orthogonal dimension, an appropriate phase and amplitude distribution is realized along each row or column of radiators. Phase and amplitude along individual linear arrays of radiators can be controlled with known techniques including, for example, selecting a particular width and/or length of microstrip used to interconnect individual patch radiators of a linear array of patch radiators and/or particular dimensions of the individual patch radiators. FIGS. 11 and 12 illustrate the amplitude distribution along a linear array of radiators controlled by the dimensions of the individual patch radiators 1120, 1220 while the phase distribution along a linear array of radiators is controlled by the length of the microstrip connections 1130, 1230. In FIG. l1the distribution of amplitude and phase along the line/vertical column of radiators 1110 shapes the antenna pattern in the vertical dimension, while in FIG. 12 the distribution of amplitude and phase along the line/ horizontal row of radiators 1210 shapes the antenna pattern in the horizontal dimension.

In another aspect of the present invention, the amplitude and phase along a linear array of radiators may be controlled using SIW slotted radiators with the position and dimension of each slot used to control the amplitude and phase of each radiator.

In yet another aspect of the present invention, a two-dimensional array of radiators may be implemented with both horizontal and vertical amplitude and phase distribution by use of a single or multi-layer corporate feed network to connect each individual radiator via power combiners.

Figure 13:
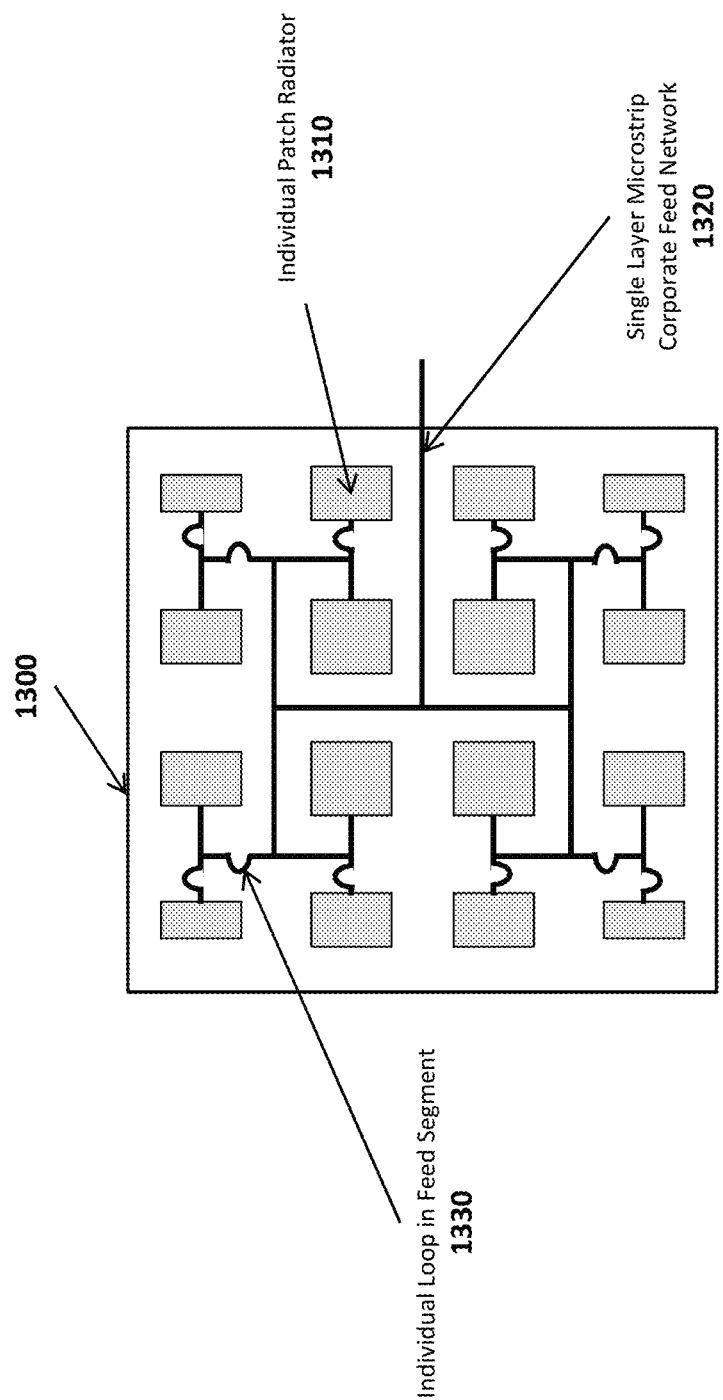
FIG. 13 is a block diagram illustrating an exemplary single-layer microstrip corporate feed network used to connect a two-dimensional array of patch radiators for shaping an antenna pattern in both the horizontal and vertical dimensions, in accordance with the present invention.

FIG. 13 illustrates an exemplary single layer microstrip corporate feed network 1320 used to connect a two-dimensional array of patch radiators 1300. The horizontal and vertical antenna patterns are shaped by the two-dimensional amplitude and phase distribution over the array of radiators.

The two-dimensional amplitude distribution for an array of patch radiators may be controlled by the dimensions of the individual patch radiators 1310 and the two-dimensional phase distribution may be controlled by the length of the microstrip feed line routed to each radiator, as illustrated in FIG. 13. The length of feed line routed to each radiator 1310 can be controlled, for example, by adding a loop 1330 of varying length to individual segments of the corporate feed network 1320.

In yet another aspect of the present invention, the amplitude distribution may be controlled over a two-dimensional array of patch radiators by varying the width of individual segments of the microstrip corporate feed network.

A variety of embodiments have been presented herein that allow for the selection of a desired antenna pattern shape using only a single sensor. As discussed herein, using a variety of patch radiator shapes, microstrip feedline lengths and thicknesses, horizontal and vertical antenna pattern shapes may be created. As also discussed herein, a given antenna pattern shape may be utilized as either a transmit antenna or as a receive antenna, or in the alternative as both.

Changes and modifications in the specifically described embodiments can be carried out without departing from the principles of the present invention, which is intended to be limited only by the scope of the appended claims, as interpreted according to the principles of patent law including the doctrine of equivalents.

The invention claimed is:

1. A radar sensing system for a vehicle, the radar sensing system comprising:

a plurality of transmitters configured for installation and use on the vehicle;

wherein each transmitter of the plurality of transmitters comprises an antenna, wherein each transmitter antenna comprises a substrate and a plurality of linear arrays of radiators, and wherein each respective plurality of linear arrays of radiators is disposed upon their respective transmitter antenna substrate;

wherein each transmitter is configured to transmit a radio signal via respective transmitter antenna;

a plurality of receivers configured for installation and use on the vehicle, wherein each receiver of the plurality of receivers comprises an antenna, wherein each receiver antenna comprises a substrate and a plurality of linear arrays of elements, and wherein each respective plurality of linear arrays of elements is disposed upon their respective receiver antenna substrates, and wherein the receivers are configured to receive the transmitted radio signals via the respective receiver antennas, transmitted by the transmitters, and reflected from objects in an environment; and wherein a predetermined arrangement of a plurality of linear arrays of radiators of a first transmitter antenna forms a shaped antenna pattern having a mainlobe and sidelobes that form a mainlobe shape and shoulder shapes to cover selected sensing zones of the first transmitter antenna, as defined by resulting phase distributions and amplitude distributions of the arranged linear arrays of radiators of the first transmitter antenna, wherein a phase distribution and an amplitude distribution along each respective array of radiators of the first transmitter antenna, in combination, define the phase distributions and the amplitude distributions of the arranged linear arrays of radiators of the first transmitter antenna, and wherein the shaped antenna pattern of the first transmitter antenna comprises a relative gain value with respect to angle that is free of sidelobe nulls or holes, such that the antenna gain in the sidelobes is free of areas with substantially reduced antenna gain as compared to the nominal antenna gain in the sidelobes.

2. The radar sensing system of claim 1, wherein the shaped antenna pattern of the first transmitter antenna has a shape oriented along, or parallel to, a first axis, when each linear array of radiators of the first transmitter antenna is arranged as a column of radiators oriented along, or parallel to, a second axis, wherein the second axis is orthogonal to the first axis.

3. The radar sensing system of claim 2, wherein an antenna gain and field of view (FOV) of the mainlobe shape and shoulder shapes are adapted to the selected sensing zones of the first transmitter antenna, and wherein the FOVs are parallel with the first axis.

4. The radar sensing system of claim 2, wherein the shape of the shaped antenna pattern of the first transmitter antenna is controlled with more degrees of freedom when a plurality of radiator columns comprises more than three columns of radiators, as compared to fewer than three columns of radiators.

5. The radar sensing system of claim 2, wherein the plurality of radiator columns of the first transmitter antenna comprises three or fewer radiator columns.

6. The radar sensing system of claim 1, wherein each transmitter antenna comprises a power combiner configured to combine their respective plurality of linear arrays of radiators into a single antenna port, wherein a relative gain and width of a shoulder shape of the shaped antenna pattern of the first transmitter antenna is determined by selecting a phase and amplitude distribution along each respective array of radiators that are combined to define the phase and amplitude distributions in the power combiner.

7. The radar sensing system of claim 6, wherein a phase distribution along a linear array of radiators is determined by a selected length of microstrip used to interconnect individual radiators of the linear array of radiators, and wherein an amplitude distribution along the linear array of radiators is determined by selected dimensions of individual radiators of the linear array of radiators.

8. The radar sensing system of claim 1, wherein the shaped antenna pattern of the first transmitter antenna is oriented substantially along, or parallel to, a second axis, when each linear array of radiators is arranged as a row of radiators oriented along, or parallel to, a first axis, wherein the first axis is orthogonal to the second axis.

9. The radar sensing system of claim 1, wherein each receiver antenna is configured to receive the transmitted radio signal reflected from objects in the environment, and wherein a predetermined arrangement of the antenna elements of a first receiver antenna forms a shaped antenna pattern having a mainlobe shape and shoulder shapes to cover selected sensing zones, as defined by resulting phase distributions and amplitude distributions of the arranged linear arrays of elements of the first receiver antenna, wherein a phase distribution and an amplitude distribution along each respective array of radiators of the first receiver antenna, in combination, define the phase distributions and the amplitude distributions of the arranged linear arrays of elements, and wherein the shaped antenna pattern of the first receiver antenna comprises a relative gain value that is free of sidelobe nulls or holes, such that the antenna gain in the sidelobes is free of areas with substantially reduced antenna gain as compared to the nominal antenna gain in the sidelobes.

10. The radar sensing system of claim 9, wherein the receiver antennas and the transmitter antennas each produce a common shaped antenna pattern.

11. The radar sensing system of claim 9, wherein the receiver antennas and the transmitter antennas each produce different shaped antenna patterns, such that the respective shaped antenna patterns of the receiver antennas are different from the respective shaped antenna patterns of the transmitter antennas.

12. The radar sensing system of claim 1, wherein a radiator comprises a patch radiator, and wherein an element comprises a patch element.

13. The radar sensing system of claim 1, wherein the shaped antenna pattern of the first transmitter antenna is oriented substantially along, or parallel to, both a first axis and a second axis when each of a first portion of the plurality of linear arrays of radiators of the first transmitter antenna is arranged as a column oriented along, or parallel to, the second axis and each of a second portion of the plurality of linear arrays of radiators of the first transmitter antenna is arranged as a row oriented along, or parallel to, the first axis, respectively, and wherein the first axis is orthogonal to the second axis.

14. The radar sensing system of claim 1, wherein two-dimensional amplitude distribution for the array of radiators of the first transmitter antenna is determined by selected dimensions of individual radiators, and wherein two-dimensional phase distribution for the array of radiators of the first transmitter is determined by selected lengths of microstrip feed lines routed to individual radiators.

15. A radar sensing system for a vehicle, the radar sensing system comprising:
a transmitter configured for installation and use on the vehicle;
wherein the transmitter comprises an antenna, and wherein the transmitter antenna comprises a substrate and a plurality of linear arrays of radiators disposed upon the transmitter antenna substrate;
wherein the transmitter is configured to transmit a radio signal via the transmitter antenna;
a receiver configured for installation and use on the vehicle, wherein the receiver comprises an antenna, wherein the receiver antenna comprises a substrate and a plurality of linear arrays of elements disposed upon the receiver antenna substrate, and wherein the receiver is configured to receive the transmitted radio signal via the receiver antenna, transmitted by the transmitter, and reflected from objects in an environment; and
wherein the plurality of linear arrays of radiators of the transmitter antenna are arranged as columns of radiators oriented along, or parallel to, a second axis, wherein a predetermined arrangement of the columns of radiators of the transmitter antenna forms a shaped antenna pattern oriented along, or parallel to, a first axis and having a mainlobe and sidelobes that form a mainlobe shape and shoulder shapes to cover selected sensing zones oriented along the first axis, as defined by resulting phase distributions and amplitude distributions of the arranged columns of radiators, wherein a phase distribution and an amplitude distribution along each respective column of radiators, in combination, define the phase distributions and the amplitude distributions of the arranged columns of radiators, and wherein the shaped antenna pattern comprises a relative gain value that is free of sidelobe nulls or holes, such that the antenna gain in the sidelobes is free of areas with substantially reduced antenna gain as compared to the nominal antenna gain in the sidelobes.

16. The radar sensing system of claim 15, wherein a shape of the shaped antenna pattern of the transmitter antenna is controlled with more degrees of freedom when a plurality of linear arrays of radiators arranged as columns comprises more than three columns of radiators, as compared to fewer than three columns of radiators.

17. The radar sensing system of claim 15, wherein the transmitter antenna comprises a power combiner configured to combine the plurality of linear arrays of radiators into a single antenna port, wherein a relative gain and width of a shoulder shape of the shaped antenna pattern of the transmitter antenna is determined by selecting a phase and amplitude distribution along each respective column of radiators of the transmitter antenna that are combined to define the phase and amplitude distributions in the power combiner.

18. The radar sensing system of claim 17, wherein a phase distribution along a linear array of radiators of the transmitter antenna is determined by a selected length of microstrip used to interconnect individual radiators of the linear array of radiators.

19. The radar sensing system of claim 17, wherein an amplitude distribution along a linear array of radiators of the transmitter antenna is determined by selected dimensions of individual radiators of the linear array of radiators.

20. A radar sensing system for a vehicle, the radar sensing system comprising:
   a transmitter configured for installation and use on the vehicle, wherein the transmitter is configured to transmit a radio signal;
   wherein the transmitter comprises an antenna, and wherein the transmitter antenna comprises a substrate and a plurality of linear arrays of radiators disposed upon the transmitter antenna substrate;
   wherein the transmitter is configured to transmit a radio signal via the transmitter antenna;
   a receiver configured for installation and use on the vehicle, wherein the receiver comprises an antenna, wherein the receiver antenna comprises a substrate and a plurality of linear arrays of elements disposed upon the receiver antenna substrate, and wherein the receiver is configured to receive the transmitted radio signal via the receiver antenna, transmitted by the transmitter, and reflected from objects in an environment; and
   wherein the plurality of linear arrays of radiators of the transmitter antenna are arranged as rows of radiators oriented along, or parallel to, a first axis, wherein a predetermined arrangement of the rows of radiators of the transmitter antenna forms a shaped antenna pattern oriented along, or parallel to, a second axis and having a mainlobe and sidelobes that form a mainlobe shape and shoulder shapes to cover selected sensing zones, as defined by resulting phase distributions and amplitude distributions of the arranged rows of radiators, wherein a phase distribution and an amplitude distribution along each respective row of radiators, in combination, define the phase distributions and the amplitude distributions of the arranged rows of radiators, wherein the shaped antenna pattern comprises a relative gain value that is free of sidelobe nulls or holes, such that the antenna gain in the sidelobes is free of areas with substantially reduced antenna gain as compared to the nominal antenna gain in the sidelobes, and wherein the first axis is orthogonal to the second axis.

21. The radar sensing system of claim 20, wherein a shape of the shaped antenna pattern of the transmitter antenna is controlled with more degrees of freedom when a plurality of linear arrays of radiators arranged as rows comprises more than three rows of radiators, as compared to fewer than three rows of radiators.

22. The radar sensing system of claim 20, wherein the transmitter antenna comprises a power combiner configured to combine the plurality of linear arrays of radiators into a single antenna port, wherein a relative gain and width of a shoulder shape of the shaped antenna pattern of the transmitter antenna is determined by selecting a phase and amplitude distribution along each respective row of radiators of the transmitter antenna that are combined to define the phase and amplitude distributions in the power combiner.

23. The radar sensing system of claim 22, wherein a phase distribution along a linear array of radiators of the transmitter antenna is determined by a selected length of microstrip used to interconnect individual radiators of the linear array of radiators.

24. The radar sensing system of claim 22, wherein an amplitude distribution along a linear array of radiators of the transmitter antenna is determined by selected dimensions of individual radiators of the linear array of radiators.

* * * * *

UNITED STATES PATENT AND TRADEMARK OFFICE
CERTIFICATE OF CORRECTION

PATENT NO. : 10,573,959 B2
APPLICATION NO. : 15/598664
DATED : February 25, 2020
INVENTOR(S) : Stephen W. Alland, Curtis Davis and Marius Goldenberg Page 1 of 1

It is certified that error appears in the above-identified patent and that said Letters Patent is hereby corrected as shown below:

In the Specification

Column 7
Line 62, "FIG.1ithe" should be --FIG. 11 the--

Signed and Sealed this
Twenty-third Day of June, 2020

Andrei Iancu
*Director of the United States Patent and Trademark Office*